May 12, 1970
A. M. NELSON
3,512,170
THERMOMAGNETIC RECORDING AND COPYING METHOD AND SYSTEM
Filed Sept. 27, 1966
5 Sheets-Sheet 1
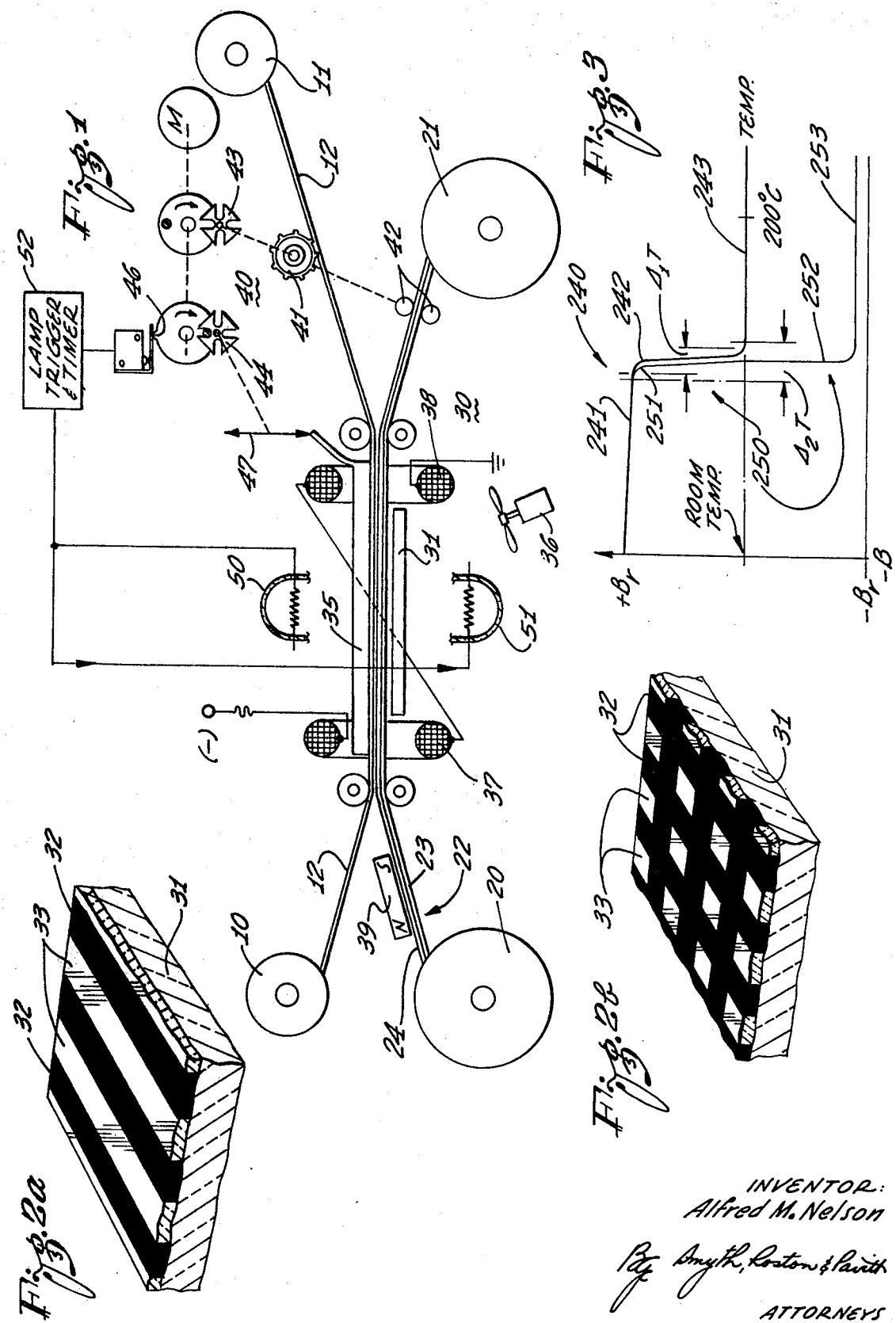
INVENTOR:
Alfred M. Nelson
By Smyth, Roston & Pavitt
ATTORNEYS

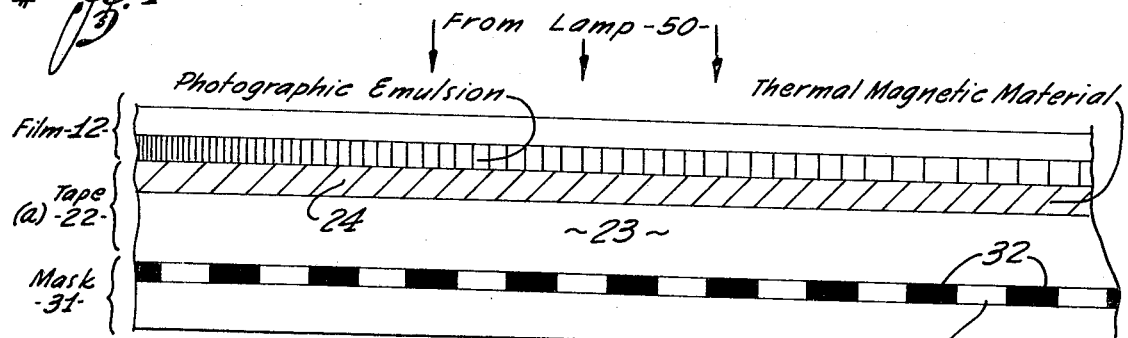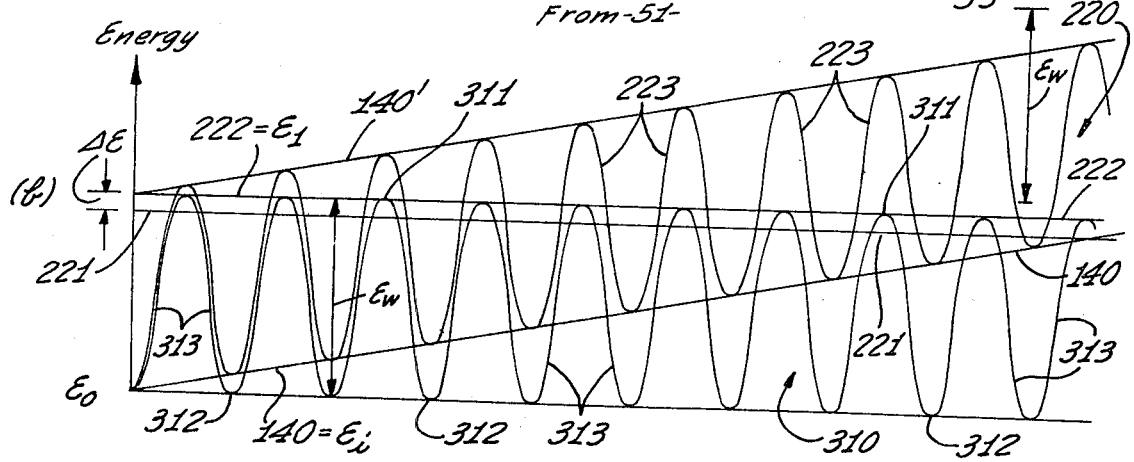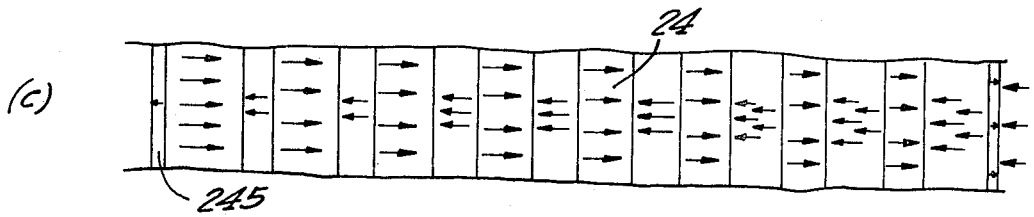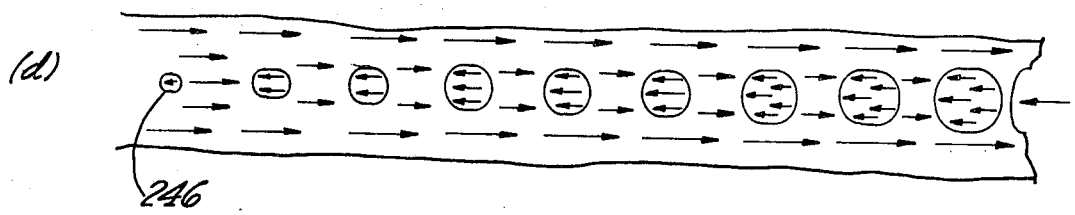

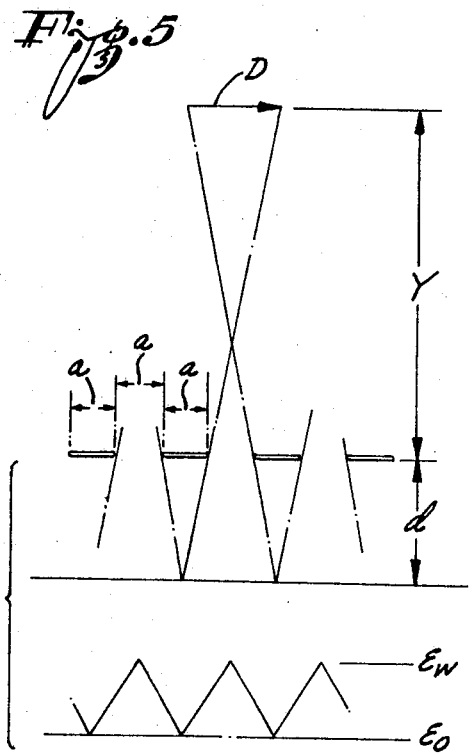
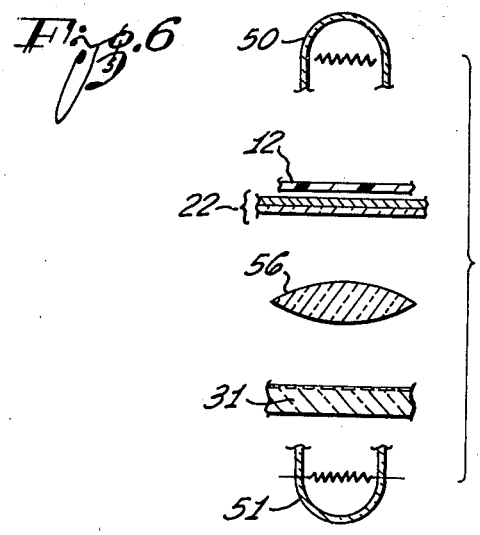
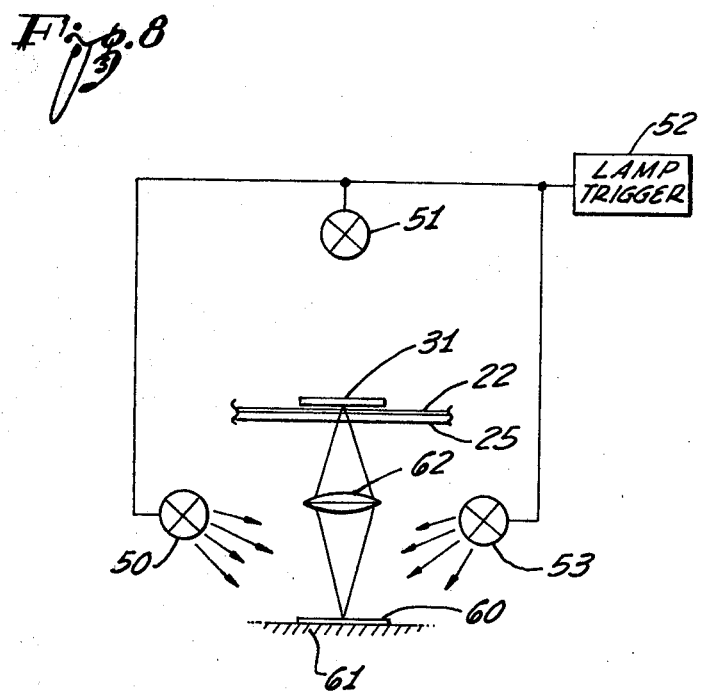

May 12, 1970  A. M. NELSON  3,512,170
THERMOMAGNETIC RECORDING AND COPYING METHOD AND SYSTEM
Filed Sept. 27, 1966  5 Sheets-Sheet 4
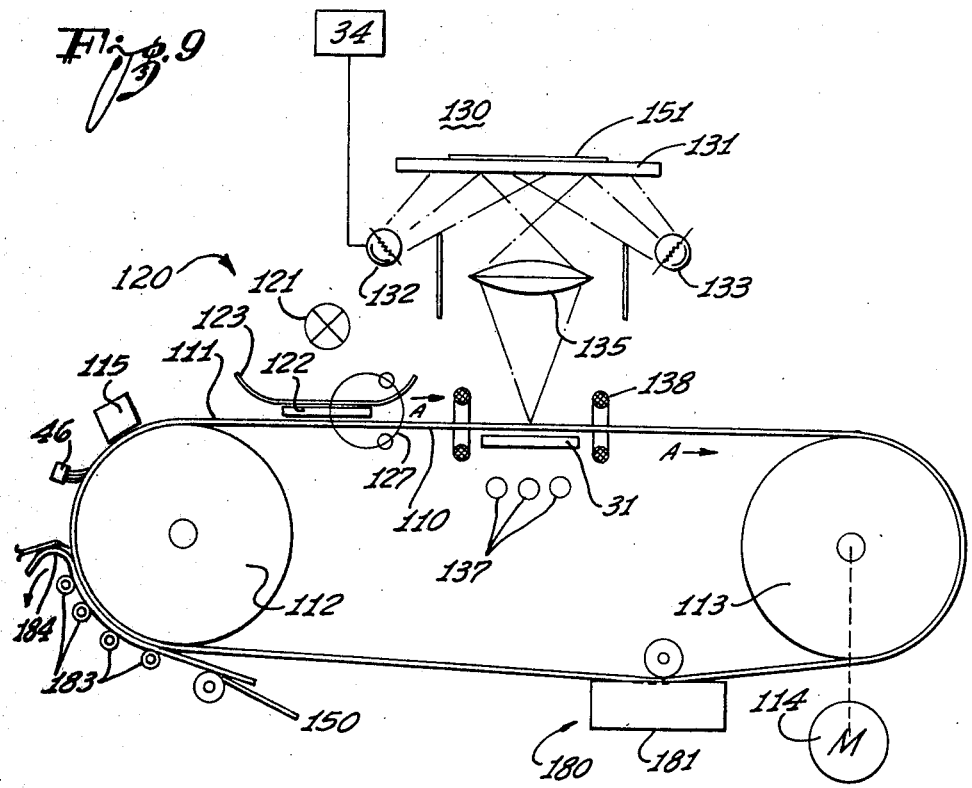
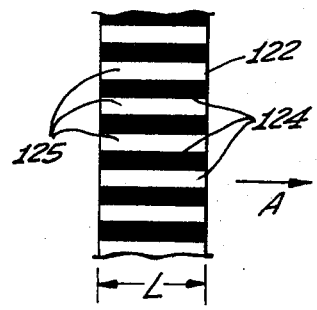
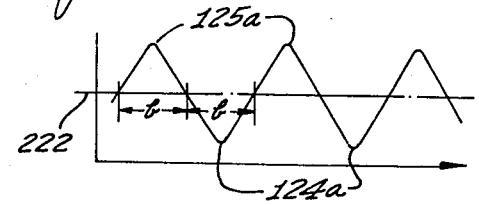
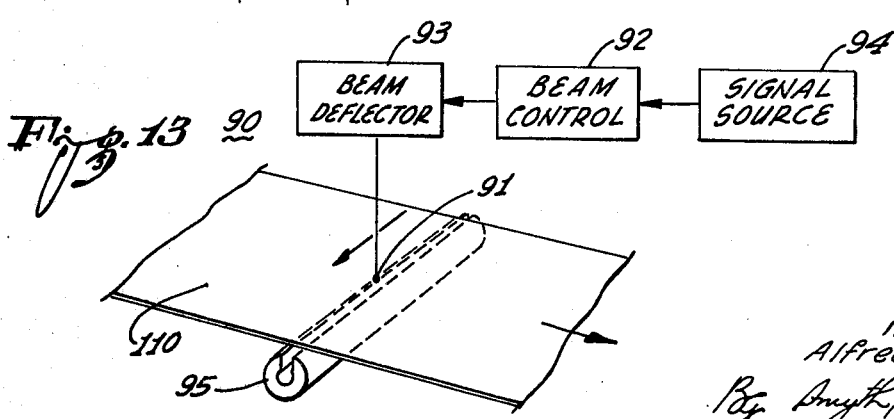
INVENTOR:
Alfred M. Nelson
ATTORNEYS

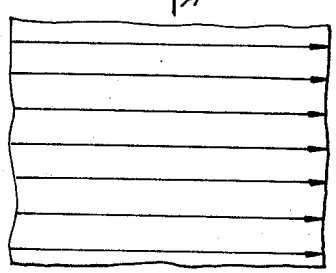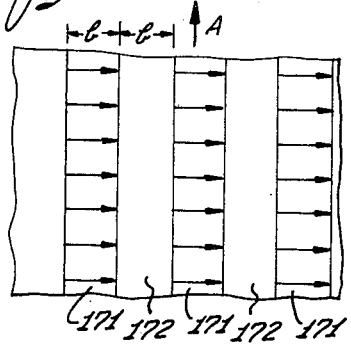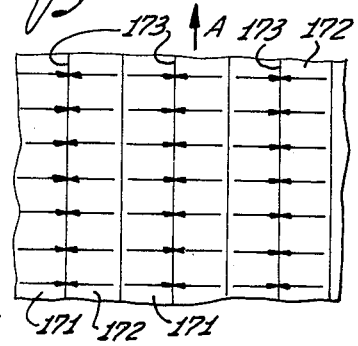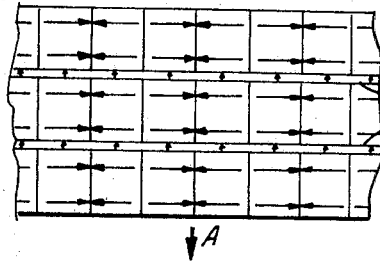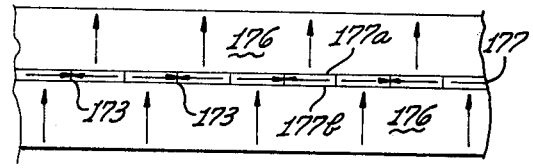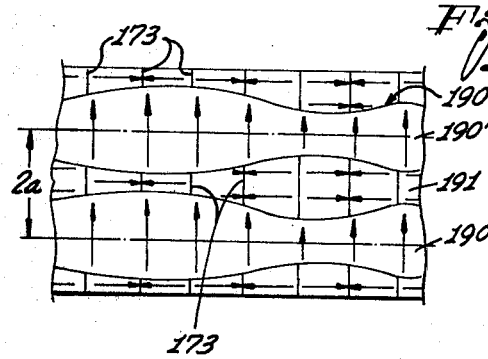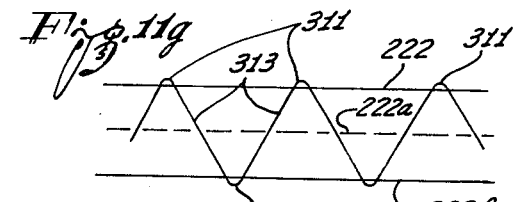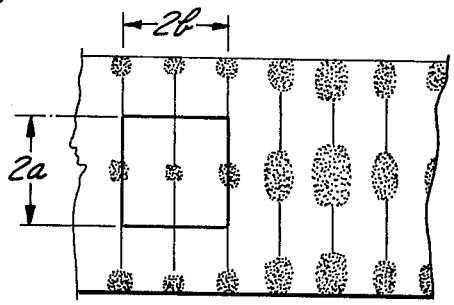

United States Patent Office 3,512,170
Patented May 12, 1970

3,512,170
THERMOMAGNETIC RECORDING AND COPYING
METHOD AND SYSTEM
Alfred M. Nelson, Redondo Beach, Calif., assignor to The
Magnavox Company, Torrance, Calif., a corporation of
Delaware
Filed Sept. 27, 1966, Ser. No. 582,358
Int. Cl. G01d 15/06
U.S. Cl. 346—74                                39 Claims

ABSTRACT OF THE DISCLOSURE

A magnetic recording and copying method and system is disclosed in which a regular pattern of magnetic pole lines is thermomagnetically produced concurrently with the application of a variable intensity pattern of radiant energy representing two-dimensional information and tending to shift the pole lines locally relative to each other, to generate image increments in which the ratio of area size of different dimensions represents a gray tone. Alternatively a regular pole line pattern is partially erased along lines transverse to the pole lines and controlled in accordance with a scanning beam.

The present invention relates to a method and system for providing two-dimensional recordings at varying "gray" tone levels, on a storage carrier such as a magnetic storage carrier, without requiring line-by-line scanning. In particular, the invention permits the copying of a photographic picture such as individual frame of a film or an individual transparency, onto a magnetic storage carrier.

Magnetic type storage, i.e., the utilization of localized remanent magnetization in ferromagnetic material for purposes of storing information, digital or analog, has long been recognized as an advantageous means of providing high density storage, so that a large amount of information data can be stored on not too large a storage carrier of this type. Magnetic storage has the advantage over photographic recording that magnetically stored information can be used immediately after a record has been made, and the information can be erased when no longer needed, whereby it is possible in particular to provide a selective erasure of a limited portion of such a carrier.

There is, however, a very limiting factor in the utilization of magnetic recording and this is the mode of conventional recording and reproducing. Conventional electromagnetic transducers for magnetic tape reproducing will recognize information at a resolution not lower than the transducer gap. Moreover, this is the maximum resolution achievable in but one direction, the orthogonal direction permits even a lesser resolution due to the width of the transducer head. This is a very limiting factor preventing full utilization of the rather high storage capacity of a magnetic tape. The tape can store information at much higher densities than the reproducing transducer can recognize. Moreover, physical contact is necessary both during recording and reproducing, unless a further loss in resolution coupled with a deterioration of the signal-to-noise level can be tolerated. It can readily be seen that recording and reproducing by means of conventional transducers can only be carried out in a line-for-line scanning mode. Two-dimensional recordings are impossible, at least with a satisfactory degree of resolution in both directions. In this respect, the photographic recording method appears to be superior, particularly in view of the two-dimensional recording field provided by an optical recording system. However, a photographic film is not erasable.

It is thus of great interest to provide a storage technique which combines the advantages of optical recording and readout techniques with the erasability and other advantages of a magnetic storage carrier. It is an object of the invention to provide a two-dimensional recording method and system which permits the recording of a two-dimensional frame, in one step, without line-for-line scanning techniques, and by means of optical recording techniques operating directly on a magnetic storage surface. The record to be produced will show gray tones in form of areas having variable size and having a particular magnetization in relation to a background of zero magnetization or oppositely directed magnetism, the latter being preferred.

According to the invention, it is suggested to use as magnetic storage carrier a material of low curie point. The material to be used thus changes from the ferromagnetic state to the paramagnetic state at a relatively low temperature. The carrier is used preferably in form of a thin layer deposited, for example, on a flexible backing member to provide a tape.

The invention is thus directed to means for establishing a recording having certain characteristics during and after the making of the recording. The recording will comprise of a particular background magnetization actually imparted upon the carrier prior to providing information thereto. The information appears on the record carrier as discrete areas of variable size corresponding to a gray tone scale, and the discrete areas are magnetized differently from the background magnetization. The discrete areas are developed in a manner that any particular area of the record carrier and of resolution size receives thermal energy composed of two components. A first component is a thermal bias and has a maximum in a point (idealized) or a line and substantially linearly declining slopes. The peak suffices to heat the material at that point or line to a temperature in the vicinity of the curie point. The second component raises the entire bias in accordance with the information proportionally to the desired gray tone for the particular area so as to define within the particular area a portion the size of which is substantially proportionate to the gray tone for the particular area and having the different magnetization in comparison with the background magnetization in the remaining portion of the particular area. It is important that the two components are additively provided to the particular area in that the production of the maxima and slopes by way of radiation modulation is separate from the information modulation of radiation constituting the second component so that these two modulations do not affect multiplicatively the energy imparted upon the particular area, but additively.

For example, the carrier is subjected to two concurrent bursts or flashes of radiant energy. The first burst of radiant energy may originate in a flash lamp type light source, and it is intensity modulated in a regular two-dimensional pattern defined by an illuminating field which has regularly alternating decreasing and increasing intensities at least in one dimension. Such a pattern may be produced, for example, by the grid formed by one or two sets of opaque (or transparent) grating lines on a transparent plate respectively setting up a parallel line pattern or a grid pattern which is preferred for reasons below. The line pattern sets up equidistantly spaced parallel lines. If two sets of orthogonally oriented lines are employed, the pattern is established by crisscross lines which define an array of regularly arranged transparent (or opaque) dots of equal size.

For purposes of defining the present invention the terms "two-dimensional modulation pattern" shall be used in relation to a field of radiant energy which when intercepting a surface is capable of energizing the material thereof over an area having definite extension in two dimensions, and the field of radiant energy has intensity variations in at least one dimension thereof, so as to include a pattern set up of a plurality of parallel lines as well as a pattern set up by two, for example, orthogonally oriented sets of lines. The term "regular modulation pattern" shall be used in this connection to include intensity modulations having spatially periodic behavior in one or two dimensions. It will be developed in detail below, why a line pattern is preferred over a crisscross grid pattern.

The first burst of radiant energy originates with unmodulated wavefronts which are then broken up by the line or grid pattern, as the opaque regions absorb light. Due to dispersion of the finite size of the radiation source, the radiation intensity will have maximum value in the center between two lines and the intensity falls off towards the sides in linear slopes. The thus modulated first burst then hits the surface of the magnetic storage carrier. This first burst will raise the temperature of the layer in accordance with the two-dimensional modulation pattern. The temperature will reach peak intensities in layer increments which are optically aligned with the respective centers of the transparent areas of the mask or grid. The peak temperature should have a value about equal to the curie point, and there will be a temperature gradient, down towards those areas of the magnetic layer, optically aligned with the ceners of the opaque mask areas.

The second, concurrently produced burst or flash of radiant energy is likewise two-dimensionally modulated in accordance with the information to be recorded. For example, the second flash lamp originates as a uniform beam of parallel light rays and illuminates a photographic transparency or film picture, and the resulting modulation contains all the gray tones of that picture.

Each area increment of the magnetic storage carrier thus receives two portions of radiant energy. The radiant energy from the first burst provides a particular thermal bias. This thermal bias follows a regular pattern in which, for example, a particular area as stated receives the maximum amount of biasing energy, and the peak or maximum energy may, as stated, suffice to render a small portion of the magnetic layer paramagnetic. The temperature as resulting from this thermal bias falls off gradually from each point of peak energy concentration, in all directions towards areas which receive minimum biasing energy. If a line structure is used in the mask, then the peak energies form paramagnetic lines in the carrier. If an orthogonally oriented system of lines is used in the mask, the peaks form paramagnetic dots. The energy added from the second burst to the layer causes a widening of these lines or dots in accordance with the local intensity of the second burst.

Radiation, i.e., light rays from the second burst which have passed through a complete clear portion of the photographic pictures will cause a widening of the line or dot to such an extent that it may merge with neighboring lines or dots, and a corresponding large area of the layer reverts temporarily to the paramagnetic state. Portions of the magnetizable layer receiving no light because an opaque picture increment of the photographic picture blocks all the light off, will not cause a widening of the respectively optically aligned lines or dots. Gray tones of the photographic picture will cause a corresponding widening of the lines or dots to the extent of the light that was permitted to pass through the gray image increment of the photographic picture.

Still concurrently with the two bursts of radiant energy as described, a magnetic field is applied to the entire magnetizable layer affected by the bursts. This field has strength below room temperature coercivity. The field may be applied before the bursts occur, which is immaterial, as the field is to be so weak that substantially no remanent magnetization is produced in the layer at room temperature or at temperatures close to the curie point. The paramagnetic regions, however, as set up by the two bursts of radiant energy will be affected by the magnetic field in that the magnetic dipoles will become fully aligned with the applied field.

The magnetic field is maintained after the bursts of radiant energy have decayed, whereby preferably enforced cooling is applied to the recording station, so that the thermal energy flows away from the magnetic record carrier rather than laterally in the direction of predominant extension of the record carrier. Such lateral flow could distort the widening-line-pattern or widening-dot-pattern as produced by the bursts.

As the layer cools all paramagnetic regions return to the ferromagnetic state while the weak magnetic field persists. This persistence prevents the magnetic dipoles in the material from returning to a state of random distribution, so that the magnetic domains grow back under the influence of an aligning field. Accordingly, there will remain a remanent saturation magnetization in all those individual layer areas which became paramagnetic upon application of the bursts or flashes of radiant energy. The magnetic field will not affect the regions which were not heated beyond the curie temperature.

The entire magnetic layer may have been subjected to a saturation magnetic field prior to the production of the bursts of radiant energy, to assume a state of saturation in a uniform direction oriented opposite to the direction of the weak magnetic field applied later on. The portions of the magnetic layer of the carrier which do not become paramagnetic during the bursts of energy will retain their original magnetization, particularly if the opposing but weak magnetic field applied during heating is below the coercivity of the material. The area where the curie point was exceeded will become demagnetized as far as the original magnetization is concerned, and the concurrently applied weak field reverses the diphoses, i.e., realigns them to produce the opposite magnetization.

The final image thus produced has the original magnetization as "background," and regularly arranged areas of variable size and of oppositely oriented magnetization define the two-dimensional recording.

The utilization of two bursts of radiant energy is necessary, because the information burst is in most cases produced by passing a uniform beam of light through the emulsion of a photographic transparency which cannot stand too high an energy level, so that there must be a high energy biasing burst which produces the line or dot pattern.

The line or dot pattern can be made finer than the effective resolution of the information beam. By using image reducing lens systems, the photographic transparency can be reduced in size to use fully the high resolution and capacity of the magnetic carrier. The line or dot pattern can likewise be produced by imaging a grating as described onto the carrier on a reducing scale.

A photographic transparency to be copied must be brought in contact with the magnetic layer without relative longitudinal or lateral movement in between during the "exposure." The magnetic layer can be mounted on a transparent backing member so that the biasing burst can be applied through the backing member, as the high energy biasing radiation must not pass through the photographic emulsion.

In accordance with particular aspects of the inventive method and apparatus it is possible to prepare the record carrier so as to permit its use as printing platen for printing at variable gray tones including the printing of relatively large areas of uniform gray tones, including deep dark tones.

The invention involves here certain basic aspects of physical characteristics and properties of media suitable for temporary storage of information to be printed subsequently in an optical-contrast producing manner. The temporary storage involves changes of such characteristics of the storage medium in a manner permitting the depositing and adherence of a toner to the surface of the medium. The storage medium is prepared for printing, basically, in a twofold manner.

First, localized, strong centers or regions of attraction for toner particles are set up in the surface of the medium the centers being distributed in a manner determining a first limit for the desired resolution of the final print out. Secondly, radiation is used to erase these centers or regions of attraction selectively and in accordance with a localized pattern inherently including also a spatial modulation in accordance with a second limit for the desired resolution. The degree or intensity of erasure within that pattern depends on the gray tone of the information to be printed in each area increment. Within any area of resolution size dimensions, originally there were regions for attracting toner particles. A portion of these regions has been erased by radiation, and the size of the erased portions is at least approximately proportionate to the intensity of the radiation (gray tone) that has hit the area. A resolution size area is one having linear dimensions of the desired resolution. For optimum results, these dimensions will be smaller than the resolution of the human eye. The attraction exerted upon the toner by this resolution size, incremental surface area of the medium thus prepared represents the gray tone of the information to be printed.

In its preferred form, the temporary store serving as printing platen is a medium that is normally ferromagnetic, but becomes paramagnetic at rather low temperatures. For example, chromium dioxide can be provided with a curie point below 100° centigrade. In a ferromagnetic medium, there are magnetic dipoles clustered to form magnetic domains, which are normally arranged in the material at random, but they can be organized by alignment with an externally applied magnetic field. The alignment will be retained to some or to a substantial degree after removal of the external field due to the ferromagnetic characteristics of the material. As a result of this alignment, a magnetic field is set up adjacent an extended and regular surface of the ferromagnetic medium thus magnetized and covering an area of the size comparable with the size of the magnetic field which was applied to that area, and which can be regarded as a macroscopic field as compared with the magnetic field set up externally by a single magnetic domain at the surface.

Consider a surface area of any size above the dimensions of a single magnetic domain; a uniform magnetic field running parallel to the surface and being thus externally applied to the material having that surface area, will magnetize the material uniformly. Therefore there is set up a uniform permanent magnetic field external to the surface and running parallel thereto. Such a field attracts magnetizable particles very little, for the following reasons. The ferromagnetic particles of or in the toner when in a magnetic field will be polarized, i.e., magnetized in that their magnetic domains are being aligned with the field. The thus aligned dipoles are then subjected to a force other than the aligning force alone, when the magnetic field has a gradient in the direction of its extension. Thus, such powder particles will be attracted towards a surface only if the magnetic field at the surface is directed transversely to the surface, and has a gradient in that direction; a field along the surface will not attract particles towards the surface. In our particular case, the storage carrier when uniformly magnetized over a particular surface will exhibit little or no attraction to magnetizable particles adjacent that area. This does not mean that such a carrier does not attract such particles at all. The border zones of such a carrier which is uniformly magnetized otherwise, will necessarily show magnetic inhomogenieties, and to these regions, which will be the end regions of the carrier, particles will be attracted indeed.

The situation is now quite different if the magnetization of the material at and underneath the surface area under consideration is not a homogeneous one. For example, a first portion of that surface area may be magnetized in one direction and a neighboring portion may be magnetized in the opposite direction. Accordingly, there is a border zone in between these two portions and in this border zone there is a strong magnetic field gradient normal to the surface. Such a gradient is proportional to a force in the direction of the gradient. Thus, magnetizable toner particles will now be attracted towards that border zone.

Moreover, we observe this. As the attracting force is proportionate to the gradient of the magnetic field in the direction of extension of the field, we are interested only in that gradient. As this is a vector, we are interested only in the particular component of that vector which is transverse or normal to the surface. The normal vector component of the field gradient, and the proportionate colinear force component, has maximum value along a border zone in relation to the normal, gradient field component and the corresponding, normal attracting force component surface regions next to the border zone.

We now must consider the specific objective. For a surface area of any size of the printing platen, it must be made possible to provide thereon toner particles at a uniform selectable density of the toner particle concentration in accordance with the gray tone, including deep black or clear white. Therefore, uniform but inhomogeneous magnetic field gradients transverse to the surface must be set up in that area. This is not a contradicting set of requirements, if one considers that "uniform" is to be understood only with reference to a scale coarser than the required resolution.

It is advisable to develop the principles involved in steps; a "uniformly" black print is to be considered first, requiring a "uniform" covering of the surface of the printing platen with toner particles. A uniform attraction of toner particles to the entire surface and on a scale of the desired resolution, can be attained if one sets up maxima of magnetic field gradients directed transversely to the surface. In between such maxima there are surface regions in which the magnetic field is parallel so that the normal field gradient in between such maxima will drop to zero. Wherever there is a gradient maxima anywhere in the surface, it will have the same magnitude. The maxima of field gradients as defined must now be distributed over the surface so that the distance between two such neighboring regions of maximum normal field gradient is smaller everywhere than the desired resolution. For example, take a point, any point, on the surface and draw a circle around it having a diameter equal to the desired resolution, then there must be a zone of maximum field gradient oriented normal or transversely to the surface, within that circle. Such a surface as a whole will attract toner particles "uniformly" as defined, i.e., with inherent non-uniformity below resolution size.

Therefore the magnetizable carrier is to be provided with a pattern of inhomogeneous magnetization so that there are many zones of strong normal magnetic field gradients distributed over the surface. For example, the surface magnetization may be provided to form a line pattern, with parallel strips forming the line pattern having alternatingly oppositely directed magnetizations. In each strip the magnetization is transversely directed to the extension of the strips. Along the border of neighboring strips or lines the magnetic field is directed transversely to the surface and its field gradient has a maximum component transversely to the surface, "maximum" understood in relation to the field gradient component normal to the surface adjacent the strips. Magnetizable toner particles will, therefore, be attracted by and towards these border zones, away from the respective centers of the strips as defined.

The width of the strips, i.e., the spatial repetition rate of the border zones setting up the strong field gradients along the border zone determines the resolution of the print. If that resolution is above the resolution of the eye, then after application of the toner, the line structure of the toner concentration along the above defined border zones is not discernible, except, of course, under appropriate optical magnification. A magnetizable toner when applied would thus subsequently produce a print out which is uniformly black or whatever color has been chosen for the dye in the toner.

For printing information of the type exhibiting a non-black, i.e., gray, or even white portions, the information is to be "placed" onto the storage carrier, in that the information causes localized and selective erasing of the border zones, using the low curie point characteristics of the storage carrier. The information to be printed is made available in form of a two-dimensionally modulated radiation field, such as produced, for example, by the reflection of light from a contrast-by-reflection-producing object, say a picture on a piece of paper or the like, or by transparency modulation of the film.

The information bearing radiation must be focused to form a planar image onto the surface of the carrier to provide selective, localized heating thereof. Additionally, the carrier is thermally biased in accordance with a regular modulation pattern, so that within arbitrary selected areas of the surface of the carrier, having dimensions not less than the desired resolution, a first region becomes paramagnetic, the size of which is proportionate to the information radiation reaching that area, which is another way of saying that such a paramagnetic region has a size proportionate to the "whiteness" of the gray tone of the information image increment as projected onto a surface area increment of the carrier under consideration. The remaining region of a surface area under consideration having the resolution size, remains ferromagnetic and is proportionate to the "blackness" of the resolution size area under consideration.

Wherever the paramagnetic state is established, it erases the initial magnetization thereof, and particularly the strong gradient normal to the surface in any such a region of what was previously a border zone, is eliminated. The paramagnetic state is maintained only for a short period of time. After decay of the information radition beam, the material cools by thermal diffusion and will thus revert to the ferromagnetic state throughout the carrier. In order to prevent remagnetization of these previously temporary paramagnetic regions from adjoining regions which remained ferromagnetic and which therefore retained their initial magnetization, a uniform magnetic field of below room temperature coercivity should be applied during the period when the paramagnetic regions revert to the ferromagnetic state. Thereby these paramagnetic regions become uniformly remagnetized at saturation when reverting to the ferromagnetic state. This field should have a direction, so that the magnetization shows only weak gradients, at its now newly established border zones with the areas or regions in which the original magnetization was not destroyed.

If one proceeds in this manner, discrete portions of the original border zones are demagnetized at first and remagnetized wherever such a border zone runs through a region which became paramagnetic. These discrete border zone portions have individual sizes at or below the desired resolution. The localized and selective erasure diminishes in the affected areas the force of the gradient field attracting toner particles, so that a macroscopic, overall effect is a variable gray tone image. A white image portion will have caused a complete erasure of the initial magnetization in these border zones, and the uniform buffer magnetization offers little attracting force for the toner particles.

The information image can be produced on the carrier in various ways. One way is by way of flashing an image in its full two-dimensional format onto the carrier. Concurrently thereto a mask having a line pattern is flash imaged also onto the carrier. The lines of the mask are alternating transparent, and opaque strips which, when projected onto the carrier, run at right angles to the extension of the above mentioned strips of initial magnetization and the border zones thereof. Each translucent mask strip permits passage of radiation to render the material paramagnetic along a zone having a local width proportionate to the gray tone of the flashed information image increment taken along a line which registers with a translucent mask strip.

If the information to be printed is available as a linear electrical signal, a scanning beam can be provided which sequentially inscribed parallel tracks across the border zones of the initial magnetization. Along that track, border zones will be erased, and the track will have a width proportionate to the intensity of the scanning beam at the instant of interception of the track-writing beam with the carrier.

The principles outlined above can be extended to other situations of platen-and-toner interactions. The carrier platen may initially bear a distinct line pattern of electrostatic charges so that there are zones along the platen having strong electric field gradients. Radiation modulated as outlined above will cause a selective ratio of the charges locally destroying the electric field gradients, so that the electrostatic attraction for toner particles is selectively diminished.

While the specification concludes with claims particularly pointing out and distinctly claiming the subject matter which is regarded as the invention, it is believed that the invention, the objects and features of the invention and further objects, features and advantages thereof will be better underestood from the following description taken in connection with the accompanying drawings in which:

FIG. 1 illustrates somewhat schematically a copy station for copying the content of a photographic film onto a magnetic tape;

FIGS. 2a and 2b respectively illustrate in perspective views masks used for producing a modulated biasing beam in the system shown in FIG. 1;

FIG. 3 illustrates two magnetization versus temperature characteristics of a low Curie point magnetic material to be employed for practicing the present invention.

FIG. 4 is comprised of three vertically aligned figures wherein FIG. 4a is a schematic cross-sectional view of a magnetic tape as contacting a photographic film and a mask during the process of recording; FIG. 4b is vertically aligned with FIG. 4a and illustrates the energy distribution as effective in the arrangement of FIG. 4a, and FIG. 4c illustrates the resulting magnetization pattern in the tape portion shown in FIG. 4a, also in vertical alignment therewith;

FIG. 5 illustrates schematically particulars in the geometric relation between biasing lamp and masking pattern to provide for a particular energy distribution in the magnetic material of the carrier;

FIG. 6 illustrates schematically a modification of the inventive copy station;

FIG. 7 illustrates another modification of the inventive copy station;

FIG. 8 illustrates a copy station for providing recordings derived from a reflecting rather than from a translucent original;

FIG. 9 illustrates somewhat schematically a side view of a printing station in accordance with the preferred embodiment of the present invention;

FIG. 10a illustrates a mask for thermomagnetically preparing the printing platen used in the printing station in FIG. 9;

FIG. 10b illustrates the distribution of the thermal energy as applied to the printing platen through the mask shown in FIG. 10a;

FIGS. 11a through 11f illustrates somewhat schematically the stepwise magnetization and thermomagnetic treatment of the platen as shown in FIG. 9;

FIG. 11g illustrates somewhat schematically the several energy distribution relations in the carrier and taken along lines g in FIGS. 11d, 11e and 11f;

FIG. 12 illustrates somewhat schematically the toner distribution on a platen portion having been prepared to show a magnetization pattern such as shown in FIG. 11f; and FIG. 13 illustrates an alternative printing station used for those cases when the information to be printed is available in form of a linear electrical signal.

Before explaining the details of the invention, an apparatus which can be used for practicing the invention shall be described first with reference to FIG. 1. The drawing shows a first pair of reels, a pay-out reel 10 and a take-up reel 11, for transporting a photographic film 12 through a copy station 30. The film carries photographic pictures arranged in regular frames in the usual manner and has been developed so that its emulsion contains variable densities of, for example, silver particles. Thus the film has areas of variable degrees of transparency and opaqueness.

Next, there is provided a second pair of reels, a pay-out reel 20 and take-up reel 21 for transporting a thermomagnetic tape 22 through the copy station 30. The thermomagnetic tape has a transparent plastic backing member 23 carrying a rather thin layer 24 of a low Curie point ferromagnetic material. This layer 24 will usually comprise essentially chromium dioxide which is ferromagnetic at room temperatures but at a temperature of about 120° to 160° C. this material becomes paramagnetic. Low Curie point materials are, for example, disclosed in U.S. Letters Pats. 3,008,176; 3,034,988; 2,996,457 and others.

Film 12 and tape 22 travel through the copy station 30 such that the photographic emulsion on tape 12 and the magnetically active layer 24 of the tape 22 can be brought into face-to-face contact. The tape 22 travels through the copy station so that the backing member 23 may come into contact with a stationary platen 31 comprising a transparent glass plate and bearing a line pattern defined by opaque lines 32 to leave transparent lines 33. This is illustrated in some detail in FIG. 2a. FIG. 2b shows a grid pattern of two sets of orthogonally arranged masking lines 32' leaving transparent, square-shaped areas 33.

It should be mentioned that the particular structure of this grid is not too important as long as several general rules are observed. However, for reasons below a line structure is preferred. The opaque portions of this masking structure such as lines 32 or 32' should preferably have a high degree of reflectivity, so that the radiation blocked by the lines is reflected rather than absorbed. The masking pattern may be produced by depositing metal in such a pattern onto a transparent plate 31.

It should be mentioned that this regular two-dimensional pattern of alternating opaque and transparent areas does not have to have any sharply defined edges as between opaque and transparent regions, but there may be a regular decrease and increase of opaqueness to transparency and vice versa. The principal point is that there are well-defined centers of complete opaque regions arranged in a two-dimensional array.

A regular pattern of such transparent lines or dots is preferred but not essential. As the distance between neighboring lines or dots will determine the resolution of the information as it can be copied, a regular arrangement is preferred over a random distribution because the latter may produce some macro modulation which becomes visible as such and produces discernible irregularities. On the other hand the grating pattern can be irregular to the extent that the irregularities do not compose discernible modulation patterns above the resolution capabilities of the system.

A movable platen 35 may engage the backing member of the photographic emulsion of film 12 to move the film towards tape 22 in copy station 30, so that the photographic emulsion of film 12 engages the thermomagnetic layer 24 of tape 22, and then the backing member 23 of tape 22 will, in turn, engage the stationary platen 31. The movable platen 35 will provide for this engaging operation as aforedescribed when film and tape 22 do not move longitudinally, and particularly when they do not move in relation to each other.

When platen 35 disengages film 12, both tape and film can be moved longitudinally. This is done by a driving mechanism 40 having a motor M as principal motive power source. The driving mechanism includes a sprocket wheel 41 to advance the film 12 in the usual manner. A friction drive such as pinch roller 42 or a capstan for advancing the tape 22 is geared to sprocket wheel 41 or even mounted on the same shaft therewith. Tape and film are advanced in individual steps, and if every frame on the film is to be copied, tape and film will advance for equal distances for each step.

The two driving elements 41 and 42 are geared to a Geneva drive 43 which insures stepwise movement of tape 12 and tape 22 with a pause of sufficient length between two succeeding moving steps, during which pause film and tape are at rest as far as longitudinal movement is concerned. Geneva drive 43 is driven by the motor M. During the period when tape and film are at rest, platen 35 will be moved towards film 12, it will stop, and after a very brief pause platen 35 will recede therefrom to remain in a retracted position for a period of time during which film 12 and tape 22 are advanced by one step.

It can be seen that tape and film advancing on the one hand, and platen movement on the other hand must be controlled in strict phase synchronism, and there is thus provided a second Geneva wheel 44 having a phase angle in relation to the position of Geneva drive 43, so that film and tape movement, on one hand, and platen movement, on the other hand, are properly interleaved. It thus appears that film and tape advance by one frame length, stop, platen 35 moves back and forth, and film and tape are advanced again, etc. During the motion cycle of Geneva drive 44, a transmission 47 first moves platen 35 towards platen 31, pauses, and recedes again. During the stationary cycle of Geneva drive 44, platen 35 is at rest in the receded position. In the illustrated position platen 35 is closest to platen 31 and thus pauses briefly before receding.

During the time platen 35 provides the above defined engaging position, two flash lamps 50 and 51 are triggered. The flash lamp 50 is positioned in the rear of platen 35 and thus platen 35 must be transparent. The light from lamp 50 passes through platen 35, through the backing member of film 12, and through the emulsion of film 12 so that a two-dimensional, i.e., area modulated light beam reaches the opaque magnetic layer 24 for absorption therein.

The other lamp 51 illuminates the thermo-magnetic layer 24 through the grid plate as set up by platen 31, whereby the pattern provides a regular light-dark pattern of like configuration as the grid has, and this pattern of modulated light then passes through backing member 23 of tape 22 to be likewise absorbed by the thermomagnetic layer 24. The thermomagnetic layer 24 is separated from the grid, as set up by the opaque and transparent areas 31 and 32, by the backing member 23 of the magnetic tape. Thus principally by dispersion and to a lesser degree by diffraction at the backing member 23, the grid pattern is not sharply imaged onto the magnetic layer 24. This smoothing of the pattern contrast is not only desired but is essential for purposes of the invention as will become apparent more fully below.

The two lamps 50 and 51 are controlled by an electric control circuit 55 as to the time when they provide illumination. This circuit 55 is triggered from a cam 46 to provide proper phasing with the motion of the platen 35 and the film and tape drives. The lamps will be triggered when the film and tape are at rest and when platen 35 likewise is at rest in the engaging position, as is illustrated.

It can thus be seen that step-by-step radiant energy is transmitted upon portions of tape 22, which portions are sequentially placed onto copy station 30. This radiant energy appears in two parts, one part is modulated by the grid structure of plate 31 to thereby provide regular modulation of radiant energy as it can reach the thermomagnetic layer 24. The second radiant energy portion reaching the layer 24 is irregularly modulated and in dependence upon the distribution of opaque, semi-opaque and transparent area increments of film 12 through which the second radiant energy portion must pass.

The copy station 30 includes further a rather strong permanent magnet 39 positioned so that the magnetizable layer 24 on tape 22 will pass in close proximity to provide uniformly a unidirectional saturation magnetization in the layer 24. This will be the magnetic "background." The station 30 further has two coils 37 and 38 enveloping the thermomagnetic tape as it travels above plate or platen 31. An electric current flows through coils 37 and 38 to provide for a magnetizing field effective longitudinally in the magnetizable layer 24 oppositely directed to the magnetization as provided by magnet 39.

The field provided by the magnet 39 will be called $+H_0$ and suffices to saturate the magnetizable layer 24 at room temperature. The field produced by current flow in coils 37 and 38 is called $-H_1$ and is lower than the coercivity of the material at room temperature. Thus, as tape 22 enters the regions magnetically controlled by the coils, the magnetism received from magnet 39 is not destroyed or even attenuated as long as the layer 24 is sufficiently below Curie temperature.

As schematically indicated by reference number 36, the copy station is further provided with a cooling means such as a fan suitably positioned to provide a forced flow of air at room temperature into the copy station. One may even use cooler air, conceivably with the injection of a $CO_2$ vapor to reach primarily platens 31 and 35 so that they will not be heated unduly by sequential flashes of lamps 50 and 51. This cool environment permits any radiation absorbed by the film and by the thermo-magnetic layer 24 to flow off perpendicular to the plane of extension of film and tape when in the copy station, so that any thermal energy developed in magnetic layer 24 due to absorption of radiant energy will not spread laterally or spread only very little laterally inside of layer 24. The thermal energy will be removed primarily down through backing member 23 or up through the film 12.

The device may be phased so that the platen 35 does not retract immediately following the bursts or flashes of radiant energy from the lamps 50 and 51. A short waiting period could be interposed in which all parts 35-12-22-31 remain in intimate contact so that the thermal energy may flow into the platens 35 and 31, to stabilize the magnetic states in the layer 24 while the field $-H_1$ persists.

We now proceed to the description of the details of the physical phenomena involved resulting in the production of variable gray tone magnetic recordings. Here we first turn to FIG. 3 illustrating particular characteristics of the thermo-magnetic material employed for layer 24. The abscissa shows temperature values plotted on any convenient scale and covering a range from room temperature at the intersection with the ordinate up to 200° C. or thereabouts. The ordinate shows remanent magnetization. The curve 24o now has been derived by the following process:

It is assumed that the thermo-magnetic material of layer 24 was subjected to a magnetizing field $H_0$ which at room temperature caused the material to saturate magnetically, so that after the removal of such a magnetizing field a particular remanence usually denoted $B_r$, remains. It is assumed further that the material is then heated up to a particular temperature value T and that finally and subsequently thereto the material is cooled back to room temperature. After this thermal treatment the residual remanence B can be measured, and this value B is plotted against the particular maximum temperature value T up to which the material was heated before cooling. Thus, the curve 240 may be arrived at by interpolating discrete measuring values B. The production of each such value B requires three steps: magnetization to saturation, heating to the particular temperature serving as abscissa value, and cooling again.

It can be seen that of course the origin of this curve must be $B_r$ at room temperature. It can be seen further that heating has very little effect on the residual remanence after cooling if heating was only in a first range of temperatures, so that the first curve portion 241 is almost parallel to the abscissa at ordinate value $B_r$. At region 242 a sharp change occurs which means that if the material having originally remanent magnetization $B_r$, is heated up to a temperature in the interval $\Delta_1 T$, then the particular maximum temperature becomes very critical as to the remaining magnetization measurable after cooling.

The branch 243 denotes that if the material was heated up to a temperature above a value within the range $\Delta_1 T$, the material has been demagnetized and after cooling no or very little magnetization is left. The branch 243 thus is indicative of the fact, that once the premagnetized material has become paramagnetic, in the absence of a persistent magnetizing field or in the absence of remagnetization there will be no remanent magnetization left, as all dipoles have attained random distribution cancelling each other out. The beginning of branch 243 approximately coincides with the Curie point of the material which depends upon the particular chemical composition, chrystal structure etc. used for layer 24. The Curie point may be in the range of 120° to 160° C. or thereabouts.

The curve 250 has a different meaning: assuming the material has been magnetized as aforedescribed to have at room temperature a saturation remanent magnetization $B_r$, and assuming further that such a material is then heated up to an abscissa value T. At that temperature T a weak magnetic field is applied to the material having opposite polarity ($-H_1$); the term weak having meaning to define any intensity lower than the coercivity of the material at room temperature. Such a field is then maintained until the material has been cooled to about room temperature. The remanent magnetization then observed, i.e., after cooling, is plotted against the maximum temperature as abscissa value which was reached during heating and at which the reversing field was applied.

It can be seen that for low temperatures the curve 250 coincides with branch 241 of the curve 240 because the low field of intensity $-H_1$ has no demagnetizing effect nor does the temperature in this range affect the remanent magnetization. However, when approaching the Curie point, the hysteresis loop of the material begins to contract. The field $-H_1$ may still be below the effective coercivity or quite close to the effective coercivity of the material at that elevated temperature, but since the hysteresis loop is not exactly rectangular, some weakening of the remanent magnetization will be observed after cooling (branch 251). If under the conditions as aforedescribed the material is heated to a temperature within a temperature interval $\Delta_2 T$ which is somewhat larger than but includes the interval $\Delta_1 T$, then the reversing field $-H_1$ produces drastic demagnetization, whereby the maximum temperature becomes very critical.

At a particular temperature value within interval $\Delta_2 T$, and rather close to the Curie point but still somewhat below thereof, demagnetization can be observed after cooling. At higher maximum temperatures, field $-H_1$ causes some magnetization in the reverse direction. The branch 252 shows this in detail.

If the material was heated to a temperature having a value above the interval $\Delta_2T$, then the original magnetization is completely removed and the dipoles are all aligned in the reverse direction. The branch 253 substantially covers the range of higher temperatures at which the material became paramagnetic during heating. The relatively weak field $-H_1$ suffices to align the then very weak dipoles of the material in the paramagnetic state. The weak field $-H_1$ is maintained during the cooling and particularly for the period during which the material reverts from the paramagnetic to the ferromagnetic state. During cooling, the magnetic domains grow and the dipoles remain aligned with the field $-H_1$, so that subsequent to the cooling the material will show almost negative saturation remanence $-B_r$ which is the ordinate value for the branch 253.

It can thus be seen, that if the material is first magnetized strongly at room temperature and placed into what can now be called positive remanent saturation magnetization $B_r$, and if the material is then heated to a temperature below any value in the temperature interval $\Delta_2T$, and if the material is then cooled again while being subjected to a small demagnetizing field $-H_1$, the original remanent saturation magnetization $B_r$ remains substantially undisturbed.

If the material is magnetically treated similar as aforedescribed but heated to a temperature above any temperature in the interval $\Delta_2T$, then after cooling the material will show negative remanent saturation magnetization $-B_r$. The inventive process now controls the resulting magnetization within small regions and corresponding surface areas of the thermomagnetic material of layer 24. With this we proceed to the description of FIG. 4.

FIG. 4a can be construed as a cross section through the copy station 30 on a very enlarged scale covering only a very small portion of tape and film in the station. There is shown schematically the backing member 13 of the photographic film 12 having the photographic emulsion 14. As indicated by the hatching the emulsion 14 shows a decreasing opaqueness or increasing transparency from the left to the right. At the leftmost side of the figure the photographic image may be regarded as almost completely "opaque" and at the right hand side the photographic image may be almost completely clear, with gray tones in between the opaque and clear regions at a gradation as resolving power and gamma of the emulsion permits.

The thermomagnetic layer 24 is juxtaposed to emulsion 14, and the backing member 23 of this tape, in turn, is juxtaposed to the grid structure or platen 31, whereby again reference numeral 32 points to the opaque portions, and reference numeral 33 points to the transparent portions of the mask. When film and tape are in this position lamps 50 and 51 will emit brief and very accurately metered light pulses, bursts or flashes, whereby the time integral of the luminosity represents the energy applied to the unit area of the layer 24. With this we turn now to FIG. 4b drawn in vertical alignment with FIG. 4a for convenience of explanation.

The curve 140 of FIG. 4b can be regarded, at first, as being representative of the amount of radiant energy from lamp 50 permitted to pass through film 12. The beam originates with uniform intensity over an area corresponding to the size of the frame it is about to illuminate. Let $E_{50}$ be the radiant energy per unit area emitted per flash of lamp 50; and K represents as a two-dimensional function the transmittivity of the film for radiant energy, then the energy permitted to pass film 12 is $K \cdot E_{50}$. $K \approx 1$ represents clear image areas and $K \approx 0$ represents opaque image areas.

The absorption of radiation is usually proportional to the intensity of the incident radiation. We consider now a volume of layer 24 bounded by a surface area mathematically expressed as a differential $ds$. The volume extends throughout the thickness of layer 24. If $\alpha$ is the coefficient of absorption of the layer 24, it follows that the amount of valiant energy absorbed in this volume is equal to $K \cdot E_{50} \cdot (1-e^{-\alpha l}) \cdot ds$. Specifically curve 140 represents an example of the spatial distribution of absorption $K \cdot E_{50} \cdot (1-e^{-\alpha l})$, whereby $E_{50} \cdot (1-e^{-\alpha l}) = E_w$ represents the energy absorbed in the layer 24 for a clear image area of the film. This relation is exact if we consider $E_{50}$ to be already diminished by the residual absorption in a clear film emulsion and the backing member 13. It follows that $K \cdot E_w = E_i$ represents the information content of the absorbed energy in the layer 24, as a two-dimensional function in a surface plane of layer 24.

Due to the area selective absorption of emulsion 14 the amount of energy permitted to pass varies and representatively, curve 140 shows an increase from substantially zero at the left to a maximum energy value at the right (per unit area). The minimum at the left hand side represents an almost opaque picture increment. We must now determine which portion or portions of the second beam and originating in lamp 51 reaches layer 24.

The second beam is emitted by lamp 51 with uniform intensity over an area corresponding to the recording field. After having passed through the modulating grid 32–33 and through the backing member 23 a cross section through the beam will have an intensity modulation similar to curve 310. Due to dispersion, this distribution of the radiation intensity as it reaches the layer 24 through the backing member 23 has regularly spaced energy peaks or maxima and correspondingly regularly spaced minima. The incident radiant energy rises more or less linear from a minimum to juxtaposed maxima.

It should be mentioned here that the abscissa for curve 310 is representative of a section across the line pattern, if the mask used has the configuration as shown in FIG. 2a. However, if a grid type mask (FIG. 2b) is used, then the abscissa for the curve is susceptible to a two-fold construction. The abscissa may be taken along the direction of tape advance and in a plane which traverses the center of one of transparent areas 33. Alternatively, the section can also be construed as being taken in an orthogonally oriented plane. Both planes, of course, extending perpendicular to the planes as defined by mask 31 or by layer 24.

Let $E_{51}$ be the radiant energy per unit area emitted per flash of lamp 51, then we may assume that as a result of the line or grid pattern the peaks of energy passing through the mask is $E_1$, and the minima are represented by $E_0$, whereby a total absorption by the masking lines 32 or 32' includes the special case $E_0=0$. If these lines 32 or 32' are semitransparent, $E_0 \neq 0$. The amount of energy now absorbed by the layer 24 is, for maxima, $E_1(1-e^{-\alpha l})$ wherein the factor $(1-e^{-\alpha l})=\lambda$ is the same as used for calculating the absorption of the information beam. For biasing minima the absorption is $E_0 \cdot \lambda$ (which may be zero).

Curve 310 now represents particularly the radiant energy which, coming from below, is absorbed in layer 24. The minima 312 represent the absorbed energy $E_0 \cdot \lambda = E'_0$, and the maxima 311 represent the absorbed energy $E_1 \cdot \lambda = E_c$. Due to the structure of mask 31, be it as shown in FIG. 2a or as shown in FIG. 2b, the biasing energy as absorbed in layer 24 forms a particular heat pattern therein. For a line pattern, the maxima 311 are actually equidistantly spaced line shaped regions in which the layer 24 has absorbed maximum amounts of radiant energy, and the minima 312 form respectively interspaced lines accordingly.

For a lattice type array (FIG. 2b), there is defined an array of energy peaks equidistantly spaced in two orthogonal dimensions separated by criss-cross lines of regions absorbing minimum energy.

In either case, there are rather steep slopes 313 in between neighboring maxima and minima. It is essential for the invention that the slopes 313 are as linear as possible and that peaks 311 and bottoms 312 are as sharply defined as possible. Any nonlinearity in the slopes deteriorates the quality of the copy. The slopes 313 can be defined by a single or double periodic function F, varying between 0 and 1 and for each slope the function should be linear. The biasing energy as absorbed in the illuminated area of the tape can be expressed as $E'_0 + F(E_c - E'_0)$.

The generation of the slopes 313 is of considerable importance, and it will be recalled here that a statement was made above to the extent that the lines or grid on the mask 30 do not have to have sharp edges. There may be gray graduations between an opaque (or semi-opaque) portion 32 or 32', and the translucent lines 33 center forming a square or a circle 33' of the mask, in order to provide for these slopes. Further linearization techniques will be discussed below with reference to FIG. 5.

The grating constant of the grid, i.e., the difference from center to center of either areas 32 or 33 may, for example, be in the order of $10^{-2}$ mm. or smaller which is still very large as compared with the size of a single magnetic domain. Nevertheless the regions involved here for receiving differing absorptions are quite small, and there will be immediately some lateral heat flow causing some homogenization of the energy as absorbed in layer 24. Cooled platens can diminish this lateral flow of heat, as it tends to remove thermal energy through the top surface as well as through backing member 23. Taking this lateral heat flow into consideration, a modification of what has been said in previous paragraphs is necessary: Of ultimate interest is that the temperature distribution resulting from absorption of this grid modulated radiant energy has these linear shapes. Thus, some nonlinearities of the energy pattern as provided coupled with subsequent lateral heat flow may result in linearly varying temperatures.

We must now determine the total amount of radiant energy absorbed in a volume $ds \cdot l$ of layer 24. As this absorption is a non-directional strictly additive process, we find that this energy is equal to:

$$K \cdot E_{50} \cdot \lambda \cdot ds + E_0 \cdot \lambda \cdot ds + F(E_1 - E_0) \cdot \lambda \cdot ds$$

In short form and per unit area $$K \cdot E_w + E'_0 + F(E_c - E'_0)$$

For a maximum bias area and a clear image area, this value reduces to $E_w + E_c$. For a minimum bias area and a clear image area we obtain $E_w + E'_0$. For a maximum bias area and as opaque image area we obtain $E_c$, and for a minimum bias area and an opaque image area we obtain $E'_0$.

Curve 220 is now substantially representative of the thermal energy developed in layer 24 and resulting from absorption of the two beams. Curve 220 is produced by adding curve 310 to curve 140. In particular this curve 220 represents the energy distribution curve for layer 24 per unit surface area throughout its thickness.

Within each differential volume $ds \cdot l$ the absorption is not uniform, but the bulk of biasing energy will be absorbed in portions of layer 24 adjacent the backing member 23, and the bulk of the information energy will be absorbed in portions of layer 24 adjacent the normally exposed surface thereof. Nevertheless, there will be immediately a diffusion of energy tending to equalize the energy distribution, provided, however, the layer 24 is not too thick; on the other hand the layer 24 must not be too thin, i.e., not thicker than the desired resolution as represented by the grating constant, i.e., the periodicity of the function F, because it is undesirable that much radiation energy can leave the layer again. In particular, the biasing beam should be attenuated so that very little biasing energy can penetrate layer 24 to reach the photographic emulsion. Thus $e^{-\alpha l} \ll 1$. For the particular material (chromium oxide) it follows that a suitable compromise is present if $l$ is equal to the inverse of $\alpha$ or several times the value of $\alpha$, and it is of advantage, that the regular thickness for magnetic tapes satisfied the optical requirements.

With this we turn to particular desired values for the operating energy levels. Lines 221 and 222 in FIG. 4b mark two energy levels on the scale used for plotting curve 220. The line 221 indicates the upper boundary or border of those low thermal energies insufficient to destroy remanent magnetization, for example, at saturation $B_r$ as it exists on the surface regions of layer 24. Moreover, if a magnetic field $-H_1$ below room temperature coercivity and of opposite direction as compared with the original magnetization $+H_0$ is applied to the coils 37 and 38, no demagnetizing occurs in regions of layer 24 receiving thermal energies below the level indicated by line 221.

The energy level indicated by line 222 is the lower boundary for those energy values per unit area which when effective in a region of layer 24 will cause the material to become paramagnetic, so that a weak magnetic field concurrently applied may cause reversal of the magnetization to be observed as a negative saturation remanent magnetization after cooling. Thus line 222 demarks an energy level for an energy value per unit area which, when multiplied by the differential $ds$, for example, defines the energy which when absorbed by the particular volume of tape 24 raises the temperature therein above the curie point.

The difference between the energy levels 221 and 222 is due to the finite slope of curve 252 in FIG. 3, and the energy gap $\Delta E$ thus corresponds to the temperature interval $\Delta_2 T$ defined above. A shortening of this temperature interval will result in a narrowing of the energy gap $\Delta E$. The energy gap $\Delta E$ defines border zones in layer 24: Portions of layer 24 receiving thermal energy below interval E retain their original magnetization substantially at saturation level $B_r$; portions of layer 24 receiving thermal energy in excess of the values in interval $\Delta E$ become magnetized at saturation level $-B_r$ during the copying process; portions of layer 24 receiving energies in interval $\Delta E$ define magnetic poles.

With this we turn to the particular dimensioning of the operating energies for the present system, and select the biasing energy from lamp 51 so that $E_1 \cdot \lambda = E_c$ is approximately that energy as defined by level line 222, and shall conveniently be called curie point energy which means that if the energy $E_c$ is present as thermal energy in a particular region of layer 24, the temperature thereof will be raised to the curie temperature. It is now another significant aspect, that the value $E_c - E'_0$ is selected to be ambient equal to $E_w$, i.e., $(E_1 - E_0) = E_{50}$ or $E_1 - E_0 = E_{50}$. In other words, the biasing differential as set up in the layer 24 due to the pattern of the mask should be equal to the information beam for a clear image area.

The formula given above for the total energy per unit area received by the tape at any point of the tape thus reduced to $K \cdot E_w + E'_0 + FE_w$, or $E'_0 + E_w(K+F)$. K is the gray-tone factor and F is the bias factor, and thus $K+F$ defines the circumstance or condition influencing all of the radiant energy as directed towards the tape. The second term of energy sum, $E_w(K+F)$, defines the energy added, by bias and information, to the minimum biasing energy $E'_0$ as absorbed, whereby $E'_0$ can be zero, but must be below $E_c$.

The formula can be written also in this manner, $$E_c + E_w(K+F-1)$$

When $K+F<1$ the tape portion so influenced remains ferromagnetic, when $K+F>1$, the tape portion becomes paramagnetic. This is based on the assumption that the bias peaks 311 just reach the curie point. Consider the case that no light reaches layer 24 from the top, ($K=O$) then one can see, that only the areas receiving the energy peaks 311 of the biasing beam reach the curie point level ($F=1$) so that a pattern of a paramagnetic lines or an array of paramagnetic dots is produced in the surface layer 24. Any information bearing radiation reaching layer 24 is added to this bias.

The adding of thermal energy to the bias will increase the energy dosage received by layer portions receiving peak bias, minimum bias, or bias along the slopes 313. Depending on the amount of information energy added to the bias, portions of the slopes 313 are raised (233) to traverse level 222, other portions still remain below level 222.

Looking at FIG. 4b, it can be seen that an area around each particular peak as produced by the bias beam and which receives energy sufficient to render the material paramagnetic increases in size in proportion to the amount of energy added from the information bearing beam which establishes the energy level 140. In particular, a completely transparent film portion as may be the case in the far right of the picture of FIG. 4 will add sufficient energy to the biasing energy so that practically the entire region of layer 24 will become paramagnetic and reverse its magnetic state under the influence of the reversing field. The added energy may suffice so as to even raise the minimum of energy in the area modulated biasing beam above the level 222. This amounts to a substantial erasure of the grid structure as it is imaged onto the layer 24 for clear image areas.

In an opaque emulsion portion substantially all of the light of lamp 50 is blocked by such opaque image area, and the corresponding area of layer 24 will be affected by the biasing radiant energy alone. This situation is illustrated in the left hand portion of FIG. 4. Here only a very narrow line (for a line type mask) or a very small dot (for a lattice type mask) will be produced, in that only the peaks 311 are effective to which nothing is added so as to cause a very small portion of layer 24 to become paramagnetic. Only narrow lines or small dots will show here some reverse magnetization after cooling. It is well within the realm of possibility to dose the biasing energy so that the peak 311 does not even traverse the level 222 so that for black image areas not even a small size, paramagnetic line or dot pattern is set up in layer 24.

The gray tones, i.e., the selected energies having value between the maximum and minimum value permitted to be transmitted through the film 12 will add particular amounts of energy to the biasing energy, thereby causing lines or dots of variable size to become paramagnetic with corresponding change in the magnetic saturation direction under the influence of the weak magnetic field.

The effect of all this is illustrated in FIGS. 4c and 4d. To the left of FIG. 4c there is shown a very small dot 245 being saturated with magnetization in a direction pointing to the left and being surrounded by a rather large portion of unaffected saturation magnetization pointing to the right and corresponding to the $+B_r$ value of the original remanent saturation magnetization. The left hand portion of FIG. 4d shows a corresponding narrow line 246. As shown in FIG. 4a the emulsion 14 has variable gray tones with decreasing opaqueness from the left to the right. One can see here that all of the dots illustrated increase in size and in FIG. 4c from the left to the right, whereas the lines in 4d become thicker, also from left to rgiht. In the rightmost portion of the figure each dot or line merges almost or does so in effect with its neighboring dot or line.

A few words shall be said about the optimum geometry, and reference is made here to FIG. 5. With reference to FIG. 4 it was explained, how paramagnetic dots or lines are being widened in accordance with the information beam. One can see, that the relationship between image beam intensity at any area and the resulting dot or line size depends on the slope of the flanks 313 in the biasing pattern. These flanks should be highly linear, and FIG. 5 shows a particular geometric relationship suitable for establishing such linear flanks at least to a substantial degree. If $d$ is the thickness of the backing member 23 of the tape 22, then this is also the distance of the mask pattern (32) from the thermomagnetic layer, unless additional transparent material is interposed. The grating constant of the mask may be $2a$, and D in the optical dispersion of the source of light 51. If Y is the distance of the light source 51 from the mask, then the following relation should be true:

$$(d+Y)/D=d/a, \text{ or } Y=d\left(\frac{D}{a}-1\right)$$

Since D is given by the lamp employed, and $a$ is determined by the resolution sought, Y and $d$ can be determined at will. A large value of $d$, however, would render the system more susceptible to diffraction, so that $d$ should not be larger than necessary, and this is the thickness of the backing member, so that the distances Y can thus be selected for optimum conditions in accordance with this formula.

Another aspect of geometry reveals that a line structure for the mask and for the resulting biasing energy is preferred over the dot structure, particularly when the slope 313 of the energy distribution curve has been linearized as aforedescribed. For this we must examine the relation between image area and information energy.

First we consider a mask with a line pattern such as is shown in FIG. 2a. We now consider a square shaped area on the magnetic tape having, for example, the size of $(2a)^2$ and being oriented so that its center is on a centerline defined by optical alignment of the centerline of a translucent line 33 with the light source and the tape. This $(2a)^2$-area can also be called resolution size area, as information having a higher resolution will not be discernibly copied. Thus, the information modulation factor K can be regarded as having an average value for the $(2a)^2$-area and interior deviations from the average can in fact be disregarded. This will be justified further below.

The biasing energy imparted upon the $(2a)^2$-area is defined now by the two-dimensional function F which can be particularized as follows: If we consider a coordinate system X–Z, having its origin in the center of the $(2a)^2$-square, with the X-axis extending transversely to the line pattern, and the Z-axis extends parallel to the lines, actually coinciding with the above defined centerline. Now the biasing function F can be defined as being equal to $$1-\frac{X}{a}$$

there is no dependency on Z. As defined above, any point where $K+F>1$ becomes paramagnetic, any point where $K+F>1$ remains ferromagnetic. Thus, for the $(2a)^2$-square there is a border line running parallel to the Z-axis and being defined by $$K+\left(1-\frac{X}{a}\right)=1$$

or $X=K\cdot a$. Thus, the total area within the square $4a^2$ and which becomes paramagnetic is a rectangle, having as one side $2a$ (measured along the Z-axis), and the other side is $2Ka$, so that size of this rectangle is $4a^2\cdot K$. Thus, the size of the portion of this $4a^2$-square which by operation of this treating process becomes paramagnetic is directly proportionate to the information imparted upon the $4a^2$ area.

The reason for this proportional relationship comes also from the fact, that biasing energy and information energy are provided separately to the magnetic layer, so that the respective energies are added in the layer. Thus the biasing means do not modulate the information energy, as this would amount to a multiplication $F \times K$ of the energy reaching any point of the magnetic layer. In this case (i.e., the mask in front of light source 50) $\lambda E_{50} \cdot F \cdot K = E_c$ would determine the conditions for any point to become or not to become paramagnetic. The border would be defined by $$\left(1 - \frac{\text{constant}}{K}\right) \cdot a$$

so that the paramagnetic area would be $$4a^2\left(1 - \frac{\text{constant}}{K}\right)$$

the "constant" being the ratio of input energy from lamp 50 over the curie point energy. Thus, there would be a non-linear relationship between paramagnetic areas and information.

If one uses a dot pattern, the situation is also different. For minimum information energy the dot area (or the line area) will be zero; for maximum information energy a dot area (mask of FIG. 2b) will be about $4a^2$ (with $a$ being the gating constant of the mask with crossed line pattern. Assuming a linear relationship of the slope in the spatial distribution of the biasing energy, the relationship between information energy $E_i = K \cdot E_w$, and the dot area will not be linear, but the dot area varies with $E_i^2$. Since energy as considered here is always measured per unit area, the imaging of gray tones would not follow a linear relationship any more. It is, however, conceivable that the biasing peaks have approximately at least a parabolic configuration and this would improve matters somewhat, this improvement would be used only for near-clear or for near-opaque image portions, not for both.

For reason of this nonlinear relationship between area and information energy it is preferred to use a line grating for bias. A line widens linear with the input information energy, its other dimension remains constant.

One can understand this better if one considers the dot-bias pattern as pyramids the height of which is energy, measured down from the peak, then any plane parallel to the base of the plane pyramid will intersect the pyramid for an area the size of which is a linear function of the square of the distance of the intersecting plane from the peak of the pyramid. That distance is the equivalent to the information energy. If there is biasing by a line pattern, then one can imagine the pattern as being made of saddle roofs with ridges representing the maxima. A plane intersecting the saddle roof thereby defines areas the size of which vary with the distance of the intersecting plane from the ridge. Thus, a line pattern is preferred as it establishes a linear relationship between information energy density and incremental image areas on the film 24.

A word of caution is needed here with regard to the accurate interpretation of FIG. 4. This figure is drawn to facilitate understanding of the invention in principle, and it must by no means be interpreted as an on-scale illustration in the sense that a very fine gray line graduation in the photographic emulsion 14 is transformed into a rather coarse pattern of magnetic field dots. Of course this is basically possible because the grating constant for the grid structure 31 can be selected at will, and if this grating constant is rather low, particularly in comparison with the realized resolution of the photographic emulsion, then the FIG. 4 would be interpreted directly and in this manner.

On the other hand, the grating of grid 32–33, i.e., the biasing pattern imparted upon the layer 24 may have a resolution equal to or even much better than the resolution of the film. In this case the curve 140 would not be quite correct but should be substituted by a step function which step function may have steps coarser than the grating pattern set up by the grid and the dots or lines. In actuality this means that the area size of the dots or lines forming regions of reversed magnetization in layer 24 taken individually may be comparable with the size of the silver particles in the photographic emulsion 14. To form a finer dot or line pattern would not serve any purpose.

In view of the foregoing description it is apparent that the bulk of the energy which permits sufficient localized heating of layer 24 for magnetization reversal of the affected area, is derived from lamp 51 and does not pass through the photographic emulsion 14. This is important, because if the opaque regions of the film would have to absorb the same amount of energy which when passing through a translucent region heats the thermomagnetic layer to exceed the curie point, then the film would surely be destroyed.

The biasing modulation varies between minimum energy $E_o$ and maximum energy $E_c$ and the energy permitted to pass through the photographic emulsion varies between 0 (or at least approximately zero) and $E_w$. The energy quantity $E_w$ plays a double role, once it is derived from lamp 51 and determines the relative height of a biasing maximum over a minimum, i.e., $E_c - E_o$, and, secondly, $E_w$ is the energy value at maximum transmittance through the photographic film for the lamp 50. The energy differential $E_w$ as derivable from biasing lamp 51 could be different from the maximum radiation information value $E_w$ as derivable from lamp 50, but similar values are preferred, because the information beam energy (from lamp 50) should at maximum transparency of the emulsion raise the total energy of minimum bias to just about curie point level, whereas maximum bias energy at zero input from lamp 50 should also just reach the curie level; this establishes the equivalency for the two values.

One can see, that the value as provided by the lamp 50 for transmittance through clear film portions, is thus the energy an opaque film portion has to absorb. Gray tones are produced by partial absorption in the film between zero and $E_w$. On the basis of the dual role for the value $E_w$ it is significant that the energy quantity $E_w$ needed in the information beam to cover the full range of pictorial information, is dependent upon the bias in that $E'_o + E_w = E_c$, wherein $E_c$ is constant and fixed by the material chosen. If $E'_o$ is now not only unequal zero, but, for example, 50% or 80% of $E_c$, $E_w$ can be quite low, and so can be the luminosity of lamp 50. One can state it differently: The energy differential $E_c - E'_o$, i.e., the curie point energy minus bias at minima gives the energy range for the information beam to cover all gray tones between completely opaque and completely clear picture zones of the photographic film.

From this, one may conclude that with $E_c$ approximately equal to $E'_o$ one may cover the entire range with very small information energy to pass through the film and only very little energy would be absorbed by the film. It is, however, desirable to bias the entire magnetic tape too close to the curie point. In other words the flanks 213 or 313 must be rather steep, and the bias minima must be sufficiently below the curie point energy so that lateral flow of thermal energy alone must not raise the energy level in the minimum bias regions (212, 312) up to the curie point. Thus, if $E'_o$ is about 50% or 80% of $E_c$, there is a reasonable compromise.

For a chromium dioxide layer having a thickness of $2.10^{-4}$ inches the energy density for rendering the material paramagnetic is 100 milli-joules per square centimeter. Here it should be noted that short exposure times are needed indeed in order to prevent lateral spreading of the thermal energy developed in the layer 24. Thus, the flashes or burst of radiant energy should be made as short as possible. The high temperature will exist for a very short period of time only in order to establish a paramagnetic state in the affected regions. Any lateral spreading of radiant energy in the layer 24 is substantially inhibited if the platen and mask are kept quite cool.

On the other hand it should be mentioned that spreading of thermal energy is not completely detrimental as it may result in an improvement of the sloping configuration of the biasing energy, line or dot pattern. From the description of the physical phenomena involved it will be apparent that the maximum temperature for each tape increment at a time the reversing field is applied is very critical, as this maximum temperature will determine specifically the magnetic state of that region after cooling.

The copy station as aforedescribed operates as follows. Drive 40 advances tape and film by one step, i.e., for a distance equal to one picture frame. During that time platen 35 is receded, and magnet 30 applies to the tape 22 a strong field $+H_0$ to produce saturation magnetization $+B_r$ in the layer 24 of the tape, thereby erasing any prior recording. Concurrently coils 37 and 38 apply a weak field $-H_1$ to the tape, which has no effect whatever as the coercivity at room temperature is larger than $H_1$. At the end of the motion cycle of Geneva drive 41 the first film frame is juxtaposed to a clean tape portion. Now platen 35 is advanced into the engaging position, and the lamps 50 and 51 flash (cam 46) to produce a temperature pattern that is a copy of the picture on the film. Cooling is to be applied continuously and platen 35 should remain in engaging position for a period so that sufficient thermal energy flows into plate 35 and mask 31 to render all of the layer 24 ferromagnetic again. Particularly all paramagnetic tape portions revert to the ferromagnetic state under the influence of the field $-H_1$. Plate 35 then recedes and comes to a stop in the receded and disengaging position, so that film and tape are advanced again. The weak field $-H_1$ may persist but causing no change in magnetism. Subsequently another picture together with a new tape portion are placed into the copy station.

A modification of the inventive copy station is shown in FIG. 6. Here the grating or grid plate 31 is imaged by an optical system 56 onto layer 24. It is apparent that by properly selecting the object plane for positioning the grating plate, and by also properly selecting the optical system, a rather coarse grating 31 can be imaged in a reduced scale, to become effective as a very fine grating for providing a high resolution thermal modulation bias in layer 24. In this way it becomes possible to always provide for a resolution of the information as copied onto tape 22 which does not deteriorate the resolution of the image of the film.

It is not necessary that the photographic film is in physical contact with the tape during the copy process, though this is preferred. The film may be imaged onto the layer 24 for providing a copy in a reduced scale. In this case, of course, there must be a reduction in speed with which the tape 22 is advanced through the copy station as compared with the speed of film, assuming that the tape and film are always advanced in unison and for the same length of time.

By projecting the photographic picture to be copied onto the layer 24 as well as by projecting the biasing radiant energy onto that layer, it is not necessary to apply the two bursts of radiant energy through opposite sides of the tape Moreover, one can use a single lamp 70 for that purpose. This type of arrangement is shown in FIG. 7.

One can see that in this case radiant energy is admitted exclusively through the top or exposed surface of the tape surface. This, in turn, means that the thickness of the layer 24 does not require consideration with regard to absorption depth because, basically, only the magnetization as it is effective at the surface of layer 24 is important, and how deep the radiation penetrates the layer is not too important.

In FIG. 7 a pair of reflectors 71 and 72 establishes two optical paths, which are oblique to terminate in a common image area on tape 24. An optical system 73 images a frame of film 12 onto layer 24, while optical system 74 images the grating pattern of mask 31 onto the same surface area of layer 24. In both cases the image is produced on a reduced scale.

The invention was explained above with reference to an automatic operation wherein the content of a photographic film is copied frame for frame onto a magnetic tape. However, it was already mentioned above that uniform transportation of the film to be copied and of the magnetic tape onto which images are being copied, is not essential if, for example, there is a selective read out as to the content of the photographic film.

The inventive method, however, is not restricted to any kind of automatic operation of the nature described above. Actually, many of the steps described above can be performed manually. For example, the photographic pictures may be individual transparencies, being negatives or positives, which can also be described as film chips and they may be mounted or unmounted. The film chips may, for example, be mounted in a window of a punched card. The thermo-magnetic material can be deposited on any kind of surface; for example, one can use individual chips which may be unmounted or also mounted in a window of a punched card. For copying film chips onto thermo-magnetic chips, they are brought into intimate contact or placed respectively into the object and image planes of the copy station. Such a placement can be done manually. Likewise, the flash lamps can be triggered manually. The thermal decay time in the thermomagnetic layer is so short, in case of a cool environment it is in the order of milliseconds or below, so that the operator really can remove the chip "immediately" after triggering the flashing, whereby his manual actions are inherently sufficiently delayed.

At least partially manual operation will be used, for example, when documents other than photographic transparencies on film have to be copied. For example, as schematically indicated in FIG. 8, a document 60, for example, a printed sheet of paper or the like, is placed on a bed 61, for example, manually. A series of lamps such as 50 and 53 is provided to provide flash illumination of the document 60. A lens system 62 collects the illuminated energy as reflected from the document and images it onto the thermomagnetic layer 24 of the tape 22. The back of the tape bears against the mask 31 and there is the biasing lamp 51 as aforedescribed. Lamps 50, 51, 53 and others if any, are flashed in unison by the lamp control device 52, which may be triggered manually. The tape 22 may also be reeled manually through the station, but it is understood, that thermomagnetic chips may instead be placed, also manually, into the station.

A device usable for purposes of providing an automatic placement of chips into juxtaposed positions is disclosed, for example, in Pat. No. 3,379,821, application Ser. No. 427,345, filed Jan. 22, 1965. The backing member 225 as disclosed and described in the specification of this patent, can be provided with a grating pattern 32 and 33 as described in the instant case. In what was termed in this patent to be the unexposed film chip will then be the thermomagnetic film chip. The plate 30 therein can be made of transparent material; the second set of lamps will be used to illuminate this transparency, and a pair of Helmholtz coils will be suitably placed for providing the magnetization needed during heating and subsequent cooling.

Turning now to FIG. 9, there is shown somewhat schematically a printing station operating in accordance with the principles of the invention. The platen element in this case, to use the term somewhat loosely, is comprised of an endless belt 110 having a transparent backing member upon which is disposed a thin layer 111 of a ferromagnetic material having a low curie point.

The belt 110 basically has a structure such as is known for magnetic tapes in general, except that it will, for most instances, be wider to accommodate normal printing formats. It should be mentioned, however, that the size of the belt is by no means critical as far as practicing the invention is concerned. The ferromagnetic material which forms the layer 11 on the belt is comprised of, for example, chromium dioxide having, for example, a curie point below 200°.

As schematically shown this endless belt 110 is reeled by two reeling drums 112 and 113. During printing operation the endless belt 110 runs in that, for example, drum 113 is driven continuously by a motor 114. The belt 110 passes through a number of stations to perform the printing operation and to be described next.

The first station, so to speak, is a permanent magnet 115 analogous to magnet 39 in FIG. 1 and positioned in sufficient proximity to the tape 110 so as to cover its entire width. It is the purpose of this permanent magnet 115 to impart a longitudinal magnetization onto this tape or belt 110. The magnetization thus provided is to be homogeneous, uniform and at saturation in a direction transversely to the direction A of propagation of belt 110. As the magnet 115 magnetizes the belt 110 in this manner it automatically erases any previous magnetization on the belt.

The next station 120 can be called a biasing station, and any portion of the belt as it has been magnetized by the magnet 115 will next enter this second station. Its principal energizing element is an elongated lamp 121 extending across the belt 110 and illuminating the thermomagnetic layer 111 on the belt. The radiation of lamp 121 passes through a grid or mask 122 extending across the belt and on top of the thermomagnetic layer 111. A screen 123 blocks the light from lamp 121 otherwise, so that light from lamp 121 to reach the thermomagnetic layer 111 must pass through the grid 122.

The grid or mask 122 is shown in FIG. 10a and is comprised of, for example, a glass plate having a plurality of equidistantly spaced opaque lines or strips 124 having transparent lines or strips 125 of similar width in between. In order to prevent undue heating of the glass mask, the lines or strips 124 may actually be reflecting the light back rather than absorbing it. The mask 122 is similar to mask 31 of FIG. 2a, except that mask 31 had to cover the entire area receiving an image by a flash in the station 30 of FIG. 1. Mask 122 extends fully across the belt 110, but has only a particular length L in direction of travel of the belt and this length L is unrelated to the width of an image to be copied on the belt.

As shown in FIG. 10b, the light reaching layer 111 is modulated in a section taken across the belt 110 forming peaks 125a and valleys 124a. The aberration of the light source 121 causes the smoothing of the light distribution as it reaches the layer 111. The geometry outlined above with reference to FIG. 5 applies also here. At a particular speed V of the belt 110 and for a length L of the mask 22 in direction of propagation of the belt, each portion of layer 111 thus is illuminated for a period $L/V$. The radiation is substantially absorbed in layer 111.

The temperature of an incremental layer portion when leaving the illuminating field is determined by the amount of radiation absorbed, minus the thermal outflow of absorbed energy during the period of illumination. The regions of layer 111 receiving peak illumination energies (125a) will have maximum temperature at the end of the illumination period; the regions receiving illumination minima will have their respective maximum temperature a trifle later due to lateral inflow of heat during the subsequent general cooling of belt portions when leaving station 120. The curve in FIG. 10b should be construed as depicting the final temperature distribution across a portion of the layer 111. Subsequently, the temperature will go down everywhere in layer 111 as it progresses farther away from the heating station. A pronounced line shaped heating pattern with a large temperature differential in between neighboring lines, measured across the tape is set up and will depend on a short period $L/V$ at a high lamp intensity. Too long a heating will tend to uniformly heat the tape throughout.

It can thus be seen that the mask 122 causes to inscribe "heated" lines onto the layer 111 having a direction of extension in the direction A of tape propagation. The energy passing from the lamp 121 to the layer 111 through the mask 122 is now metered so that the multitude of the thin light beams, as they are formed by operation of the mask 122 as they heat the layer 111 in the line pattern, inscribe a plurality of parallel tracks of paramagnetic states onto the tape 111.

In the direction of travel, the mask 122 may be very small (L), so that at the given speed V of the belt 110, each belt increment which is being subjected to such radiation energy is so subjected only for a short period of time, sufficient to raise the temperature of that track portion so heated by radiant energy to the paramagnetic state level, i.e., to a temperature above the curie point as depicted by level 222, while parallel thereto there are lines left in which the layer 111 maintains the below-curie point ferromagnetic state. The heating step should last only for a short period of time $L/V$ so that the thermal energy developed in the thermomagnetic layer 111 does not spread laterally, i.e., crosswise to the direction of propagation of the belt 110 to a substantial degree, but decays primarily to its environment above and below. Thus the line pattern of alternating non-paramagnetic states and paramagnetic states as inscribed upon the magnetic tape 111 in station 120, should result in strips of uniform width b, corresponding to the grating constant of mask 122.

FIG. 11b illustrates now the magnetization on the belt 110 as it would leave the biasing station 120 if there were no further devices, but they shall be disregarded for a moment in order to develop in steps the phenomena involved. One can see that there are narrow strips 171 which remained ferromagnetic, and which thus have retained the magnetization which was imparted upon the belt by the permanent magnet 115. There are strips 172 running parallel to the strips 171 in which the radiation which passed through the grid or mask 122 erased such magnetization. The illumination energy in station 120 is now metered and the period of illumination $(L/V)$ is now chosen that the strips 171 and 172 have approximately equal width b.

Station 120 comprises, furthermore, a pair of coils 127 which impart a weak magnetization upon the layer 111 when it passes through the station 120. More precisely, the magnetization of coils 127 affects layer portions as they are about to leave the illumination field, and for some distance thereafter, so that the magnetization is effective while the strips 172 revert from the paramagnetic state to the ferromagnetic state. The field applied by the coils 127 is below room temperature coercivity so that the magnetization in the strips 171 is not affected by the magnetic field set up by the coils 127. The magnetization imparted upon the thermomagnetic layer 111 by the coils 127 is also longitudinally directed, but has a direction opposite to the field which was imparted by the magnet 115 upon the belt 110.

The magnetic field as set up by the coils 127 is to be sufficiently strong to align the weak magnetic dipoles in those portions of the thermomagnetic layer 111 which became paramagnetic, i.e., in the material along the strips 172. The extension of the coils 127 is now chosen so that the magnetization continues to be imparted on the layer 111 as it leaves the illumination field of the station 120, so that the magnetic field persists while the material of the layer 111 in the lines or strips 172 returns or reverts to the ferromagnetic state, i.e., while the temperature everywhere in layer 111 drops below the curie point.

Even though the field from coils 127 is weak, it suffices to align all dipoles in layer regions 172 in layer 111, and as the temperature drops below the curie point the dipoles remain so aligned, expand under the influence of the aligning field from coils 127, and the magnetic domains regrow in an aligned relationship. As the temperatures drop well below the curie point, the strips 172 become saturated with magnetization and remain so thereafter.

FIG. 1 can now be construed as showing the belt leaving station 120, but still being paramagnetic in strips 172. The magnetization pattern as it exists in the belt portion that has left the station 120 and is ferromagnetic throughout is shown in FIG. 11c. The strips 171 still have their original magnetization as they did not become paramagnetic, and the weak magnetic field provided by coils 127 did not suffice to de- or re-magnetize the material in strips 171. The strips 112 now have an oppositely directed magnetization. It will, therefore, be seen that the magnetic layer 111 of belt 110 is provided with a biasing pattern in which there is established a line structure as shown by the border zones 173, having a grating constant $b$, half of that of the mask 122 which was $2b$. This line pattern as set up by the border zones 173 is defined by a series of equidistantly spaced parallel thin zones where the normal magnetic field gradient has maximum values as compared with the normal gradient along the center lines of strips 171 and 172. One can also say that the lines 173 are actually alternating magnetic surface north and south poles extending across the belt 10.

Disregarding for a moment station 130 we proceed first to the description of the station 180. Station 180 is comprised of a tank 181 which stores the toner comprised of a dye in liquid form intimately mixed with a ferromagnetic powder. The belt 10 is guided through the tank 181 so that the toner imxture can be magnetically drawn onto the layer 111 in those areas showing a strong magnetic attraction, whereby in particular strong normal magnetic field gradients in layer 111 of belt 110 will tend to concentrate this magnetizable toner. As was developed above, such strong normal magnetic field gradients are set up along the border zones 173.

The grating of the mask 122 and the resulting line structure 173 is representative of transversely oriented surface lines of high normal magnetic field gradients in layer 111. The grating constant may, for example, be several hundred lines per inch or higher. Thus the magnetizing pattern previously imparted upon the belt 110 by operation of the stations 115 and 120 when otherwise undisturbed will attract large amounts of toner particles, and the toner will concentrate along these lines 173. Since these lines are so very densely spaced, it is apparent that the entire belt width will be provided with toner material which will adhere to the belt along these zones 173. Thus the toner is arranged on the belt along the lines with a line structure above the resolution of the human eye. It is this aspect which determines primarily the selection of the grating constant of the mask 122 and the resulting line structure as provided on the belt.

The printing station 180 next comprises a paper feeder which by means of, for example, rollers 43 places either individual sheets of paper 150 or paper from a continuous roll of paper into juxtaposition to the belt 110 as it reverses its direction, along a portion of the circumference of the drum 113. The rollers 183, in addition, may be provided so as to press the paper 150 against this belt 110 so that the toner can be deposited onto the paper 150 for adherence thereto. At 184 the paper leaves the printing station in that the paper is separated from belt 110. For example, the paper may be rewound, or individual sheets may drop into an outlet chute.

The surface of the paper 150 which contacted the belt 110 will be uniformly printed in black, or whatever color had been chosen for the toner. Since the line structure has been chosen to be above the resolution of the eye, the paper 150 will appear to the observer as having been provided with a uniform layer of color. The basic reason for this is the distribution of a multitude of discrete areas of high normal magnetic gradient in layer 110 (pole-zones 173) and in a pattern the structure of which is above the resolution of the human eye so that the individual lines merge and give the appearance of a uniformly dyed or colored surface.

We have described the printing process as it would occur if no information were to be copied or printed, and we turn now to the station 130 with the aid of which information can be recorded onto the tape 110 for being printed. This copy station 130 is comprised of a glass plate 131 which serves as a bed for a sheet of paper 151 or any other surface bearing printed or any other kind of contrast-producing information, and from which a printed copy is to be made. For convenience of reference, we shall refer to 151 as constituting the object having visible, contrast-producing information on its surface which is to be copy printed.

A plurality of lamps such as lamps 132 and 133 are provided, and these lamps are controlled electrically by a control device 134 in order to provide brief flashes of radiant energy. The lamps are positioned to illuminate the side of object 151 which has the information to be copy-printed. It can be seen that in this case it is the underside of the sheet 151 which faces the bed 131. A lens or any other suitable optical system 135 images the content of object 151 as an image field onto the top of layer 11.

On the other side of the belt 110, i.e., inside of the loop as established by the endless belt 110, there is provided the masking plate 31 having basically a similar line structure as the mask 122, though it is not essential that the grating constants are similar. Mask 31 must be at least as large as the size of the image as produced by lens 135 onto the layer 111. Or more precisely, the mask 31 must have at least the size and format of a single picture. The optical structure of the lines on mask 31, i.e., the alternating transparent and opaque lines thereof, is oriented to extend across belt 110, i.e., transversely to the direction A of propagation of belt 110 in station 130, so that the lines 32 and 33 are orthogonally related to the lines of the mask 22.

A brief remark is necessary here with regard to the relation between the grating constants of masks 22 and 131. These grating constants do not have to be similar, but preferably they will be similar, because the coarser one of the grating line systems will determine the resolution, and, therefore, a respective finer resolution by a finer grating line structure in one mask is unnecessary. Thus we shall speak throughout this application of similar grating constants of these line structures in either mask, bearing in mind that in case of an unequal line structure it is the coarser one which determines the resolution, and it is only that line structure which then has meaning for practicing the invention in a satisfactory manner.

A set of flash lamps or a single flash lamp 137 is provided having structure similar to the flash lamps 132 and 133 and being controlled in a manner similar to the control of lamps 132 and 133 by device 134, so that the lamps 137 flash concurrently with the lamps 132 and 133. By operation of all these concurrently flashing lamps, a portion of layer 111 of belt 110 is thus exposed from the top of the imaging rays of lens 135, and the same portion is exposed from the bottom through the mask 31 and the transparent backing member of belt 110.

At this point several structural alternatives should be discussed, but they are all equivalent and concern the sharpness of the illumination pattern produced by the several lamps in station 130. The station as shown is to be traversed by the belt when continuously running, which means that the illumination period must be shorter than twice the grating line distance of the mask 31 over the speed V of the belt 10. Any longer illumination would tend to erase the thermal pattern as set up in the belt by the radiation heating through the mask 31. Details of this pattern will be discussed later. For grating constants of, say, fifty lines per millimeter, and for a belt speed of $10^{-10}$ meter per second, the illumination period should be below $10^{-4}$ per second.

In order to avoid the setting up of such stringent interrelationships between grating constants, belt speed (i.e., printing speed) and illumination period, it may be advisable to provide for belt loops ahead and behind station 130. By means of pinch rollers the belt portion in station 130 is then temporarily halted during the illumination period in station 130 so that the belt in general will run continuously, but a portion may stop briefly for the exposure in station 130.

As another alternative, one can drive the belt 110 always intermittently whereby the lamp 121 is turned on only during the belt advance, while lamps 132, 133 and 137 flash only when the belt stops. The driving steps then have to be somewhat larger than the image length in direction A of belt advance so that the biasing station 120 can operate uniformly at least over an area equal to the size of an image field later on to be provided by lamp 135; any thermal disturbances resulting from the belt starting and stopping and resulting further from turning on and off of lamps 121 will not affect those belt portions biased in station 120 and to be used later on directly and immediately in station 130 to receive an image for printing. Still another modification using an intermittent belt drive requires a full image size of mask 122, and then lamp 121 can be operated as flash lamp, also when the belt stops. The magnetizing coils 27 must then be large to bias a full image size area of layer 11 in one step.

It appears now to be advisable to described the phenomena involved in the production of the image in station 130 by considering several different cases. It shall be assumed first that the surface of master or object 151 bearing the information to be copy-printed is either black, or we just consider a relatively large black, i.e., dark portion characterized in that the light for lamps 132 and 133 is substantially absorbed in such a portion, so that the corresponding image as produced onto layer 111 by means of the lens 135 is very dark indeed and little or no radiation from the flashes of the lamps 132 and 133 reach the particular portion of the thermomagnetic layer 111.

From below, the same portion of layer 11 is illuminated by a biasing beam originating in the lamps 137 and modulated by grid 31. Basically the illumination pattern reaching the layer 111 is similar as it was produced with the aid of mask 122 except that the grid is positioned adjacent to the backing member of the belt 110 so that this light reaches the thermomagnetic layer 111 through the transparent backing member of the belt. It is furthermore postulated that the thermomagnetic layer is rather thin so that as far as energy absorption by any incremental layer portion is concerned, it does not make any real difference whether the light comes from the top or from below.

The light flash as produced by the lamps 137 is now metered so that the peak energies of the radiation reaching the layer 111 along lines optically aligned with the imaginary center lines of the transparent strips of mask 31 suffice or just suffice to render a portion of thermomagnetic layer 111 paramagnetic. Less energies do not so suffice. The result will be explained now with reference to FIG. 11d.

It can be seen that the peak energies of the light influence portions of this layer 11 which form very thin lines 175. These lines 175 register, i.e., are in optical alignment with the centers of the transparent lines or bars of the mask 31, along the optical path extending from lamp 137, through mask 31 to layer 111.

As depicted also in FIG. 11d, lines or narrow strip shaped areas 175 represent the portions of the magnetizable layer 11 in which the original biasing magnetization is erased or at least is somewhat weakened, because the material is raised to the paramagnetic state or almost to the paramagnetic state by the radiation energy from lamp 137 reaching layer 111 after having traveled through the centers of the translucent strips of mask 31.

In addition, now, station 130 includes a pair of magnetizing coils 138 magnetizing the heated portions 175 while they revert back to the ferromagnetic state after the light flashes have decayed. The direction of the magnetic field as provided by the coils 138 is oriented transversely to both types of initial biasing magnetization (FIG. 11c). In addition, the magnetic field as provided by the coils 138 in layer 111 is below room temperature coercivity, so that the magnetic field acts only on the temporarily paramagnetic portions of layer 111, in this case the thin strips 175, leaving the magnetization in layer 111 otherwise as it was before.

The purpose of this magnetization is to prevent restoration of the biasing field pattern in these heated portions 175 when and after they revert from the paramagnetic state to the ferromagnetic state. Thus the magnetization as provided by the coils 138 and persisting during the time these portions 175 revert to the ferromagnetic state effectively prevents regrowing of these zones 175 in accordance with the initial magnetic biasing pattern.

It was assumed that a portion of the original picture on master or object 151 and imaged onto the magnetic layer 111 was completely dark. This has now the effect that in station 130 only grid modulated illuminating energy reaches layer 111, nothing else. Thus, the original biasing pattern is practically not disturbed by the thin lines 115. After application of the toner, a uniform blackening still occurs upon print out of these particular portions, and the lines 175 have little or no effect on the print out. This is particularly so as the repetition rate of the lines 175 is also at or below the resolution of the human eye.

Now the second case shall be considered. A portion of the original or object 151 to be copy-printed may be white or very bright. In this case the maximum amount of light is reflected by object or master 151 and directed by the optical system 135 onto the particular portion of the layer 111. This imaging illumination of maximum intensity is superimposed upon the biasing illumination concurrently applied from below through mask 31. It is now assumed that the light intensity of the imaging beam is such that it raises the temperature in layer 111 above the curie point practically everywhere, even in those portions or at least almost also in those portions which are optically aligned with the centers of the opaque strips of the mask 31 which in turn receive minimum biasing energy from below.

As illustrated in FIG. 11e the effect of this composite illumination can be considered as resulting in widening of the strips or areas 175 of FIG. 11d so as to form now very broad strips 176 which almost merge. It is possible and actually quite immaterial in principle that small portions 177 in between adjacent broad strips still retain the original magnetic bias. These portions or lines or strips 177 are in alignment with the imaginary centerlines of the opaque strips 32 of the mask 31. Thus these portions 177 may not have quite reached the curie point and thus retain some of the original biasing pattern. Some toner particles will adhere to the small zones 173 still left in strips 177, and thus may produce a slight graying on the copy sheet 150. It is also possible in an extreme case of brightness of the object, to eliminate any original magnetization in layer 111, so that the broad strips 176 as shown in FIG. 11e may actually merge, and the layer 111 becomes really uniformly magnetized in accordance with the magnetization impressed upon the belt by the coils 138 in station 130.

It appears, therefore, that upon application of a toner in station 140 little if any toner material will attach to the belt portion bearing a magnetization of the type illustrated in FIG. 11e. The surface here offers only very weak normally directed magnetic field gradients; some toner material may be attracted but only very little so. It can be seen further that an absolute pure white object portion may result in a complete erasure of the initial biasing magnetization with no zone such as 177 to remain, so that the resulting magnetization in layer 111 is actually completely uniform and analogous to a uniform magnetization as shown in FIG. 11a, only that the direction of the magnetization is different. This difference in uniform direction of magnetization however has absolutely no effect whatever on the possibility of attracting magnetic particles of the toner for attachment, as the principal attracting force requires a magnetic gradient normal to the surface.

One will now understand how the system operates for printing pictorial information on a variable gray scale. For this we turn first to FIG. 11g showing the biasing energy distribution as developed in the layer 111 taking along any cross sections g as is denoted in FIGS. 11d, 11e or 11f. This curve 310 in FIG. 11g describes the configuration of the energy distribution resulting from the modulation by the grid 31 alone and being representative of absorbed energy in the layer 111 so affected. The curve is indeed identical to the curve of like designation in FIG. 4. The energy curve thus shows also the peaks 311 which are energy peaks resulting from substantially unrestricted passage of light through the respective centers or, more accurately center lines, of the translucent strips 33 in the mask 31. The minima 312 are those energies which are provided to portions of the layer 111 registering with the center lines of opaque strips 33 of mask 31. Conceivably that energy value at minimum level 312 may be zero; however, for reasons of proper overall bias it may be advisable to select a non-zero value, which means that the light absorbing or reflecting bars or strips on mask 31 do not completely absorb the light from lamps 137 but permit passage of some light to establish a minimum energy level for the biasing minima 312. Details of this aspect were discussed above and are also valid here.

It is now postulated that biasing energy is metered so that the peaks 311 are sufficient to raise the temperature in the so affected areas of layer 11 above the curie point or at least close to the curie point. This is the meaning of the level 222 as illustrated in FIG. 11g. If, however, the curie point is not very exactly defined in the material, the statement can be made that these energy peaks bring the temperature of the so affected layer areas to about the region of the curie point, to become paramagnetic or to have their ferromagnetism reduced substantially.

For a "black" area on the original object 151, no energy is added to the biasing energy and, as was outlined above with reference to FIG. 11d the curie level 222 is not shifted relative to the biasing energy distribution curve 310 when the various lamps in station 130 flash. This explains now, from a different point of view, how the strips 175 in FIG. 11d are being set up, as they are those portions of the layer 111 which do receive just the peak biasing energies from modulation by the mask 31, but little or nothing else, or even a trifle less.

Any information energy resulting from reflection at the surface of object 151 adds to the biasing energy. Thus, for an incremental image portion of the layer 171, this adding of information energy effectively shifts the curie level down relative to the biasing curve 310 for that particular incremental layer portion. Line 222b represents the curie level when a complete white portion of object 151 adds a large amount of reflected energy to the bias. That energy is the difference between the levels 222 and 222b.

As was explained above with reference to FIG. 11e, a completely white portion of object 51 causes so much energy to be added, that the minima 312 are raised or almost raised close to the curie point. One can see further now that any information energy due to a gray tone in a particular area of the picture on the surface of object 151, being neither completely black nor completely white, adds a particular amount of energy to a portion of the layer 111, so that the curie level for that portion appears to be shifted relative to biasing curve 310 to a value in between the levels 222 and 222b. For example, the curie level at 222a causes the temperature of a portion of layer 111 to be raised above the curie level, along the line structure of mask 31, while parallel portions still remain ferromagnetic. Thus one can say that the adding of a particular information energy being representative of a particular gray tone of the object picture to be copyprinted, lowers the curie level in relation to the biasing energy distribution, for example, to the level 222a as shown in FIG. 11g. The line or strip 175 defining the initial bias at any area increment will at that particular point be widened so that a somewhat broader zone becomes paramagnetic.

With this we turn to FIG. 11. Reference numeral 190' denotes imaginary center lines which are in optical alignment with the center lines in the translucent bars or stripshaped areas 32 of the mask 33. Along these lines 190', there are now areas 190 of variable width in which the original magnetization is destroyed, and the width variations represent the average image intensity along and adjacent lines 190'. In the right hand portion of FIG. 11f, there is now shown an image increment which was rather bright and, therefore, caused a considerable amount of information energy to be added to the biasing energy. As a result thereof, the biasing lines 175 are widened proportionately to establish a correspondingly wide area assuming the paramagnetic state in the layer 111. In the middle portion of FIG. 11f the information is comprised of a relatively dark image portion, and the biasing lines, therefore, are not much widened, while in the right hand portion of FIG. 11f again there is a somewhat brighter image portion.

The resulting strips 190 of variable width, therefore, show in the left hand and in the right hand portions of FIG. 11f extensive erasing of the original biasing magnetization as was established in a manner shown and described with reference to FIGS. 11a, 11b and 11c, while in the central portion of FIG. 11f only little of the original biasing magnetization is erased. The biasing beam in station 130 and the imaging beam in the station 130 set up variable width strips along a line pattern which is orthogonal to the original line pattern. The strip-shaped zones vary in width in dependence upon the gray tone scale of the image taken along any one of the biasing lines.

It can be seen further that throughout the strip-shaped areas 190 a uniform magnetization is established by operation of the coils 138. The resulting buffer magnetization has an orientation transversely with the initial biasing magnetization anywhere. Looking now at the magnetic field pattern in greater detail, in the left hand portion and in the right hand portion of FIG. 11f, the original existing strong gradients in contiguous, line-shaped zones 173 are intermittently erased and, where erased, are substituted by the uniform magnetization as shown in the strip shaped regions 190.

The same result can be considered from a different point of view. Originally there was set up a line pattern 173 providing a dense distribution of strong normal magnetic field gradients organized in a line pattern and providing maximum attraction of magnetic toner particles in relation to their respective environment. These zones were distributed so densely that they were beyond the resolution capabilities of the eye for best results. Station 130 erases that pattern of the lines 173 in a selective manner. When no information energy is provided (dark portion of object 151), there is little erasure from the masking field of lamps 137 alone or none at all. When a very bright or strong information energy is provided, the pattern 173 may be completely or almost completely erased, and little or no areas are left for providing an attraction for the magnetic toner particles. Gray tones of the master 151 partially erase the magnetic field gradients along lines 173 and the erasure is organized along the transverse line pattern forming elongated variable width zones 190. The extent of the erasure depends on the brightness of the gray tone image at any area having a size above comparable dimensions of the line structure.

It must now be remembered that these FIGS. 11 show the actual dimensions on a very large scale. As repeatedly stated, the line patterns as produced has a resolution higher than the resolution of the naked eye, which means that after a toner has been applied, the left hand and the right hand portions of FIG. 11f will appear relatively light, the center portion will appear relatively dark so that one would see two different shades of gray with a gradual increase towards the middle portion of the FIG. 11f. It can be seen further that this shading in gray tones may just barely be discernible by the naked eye, as the total area illustrated in FIG. 11f may in reality depict a small fraction of a square millimeter.

It is necessary to point out that the magnetization in the strip-shaped areas 190 sets up gradients to the zones in between having still the original magnetization along the original pattern of strips 171 and 172. These gradients, however, are very weak and by no means comparable with the erased gradients along the original zones 173 in the interior of areas 190.

It can thus be seen that by selectively erasing the original magnetization in accordance with the line pattern orthogonal to the line pattern of the original magnetization and by concurrently establishing magnetic buffer zones in the erased portions by operation of the coils 138, the original, uniform distribution of normal magnetic gradients are selectively and area-wise weakened and erased.

FIG. 12 illustrates now representatively the distribution of a magnetizable toner in the portion of FIG. 11f which can also be considered to be an enlarged portion of the print out on sheet 150 of that particular image portion.

Reference is agin made to the geometry outlined above. Take the rectangle 2a–2b as shown in FIG. 12, with $a$ being the width of an opaque or of a translucent bar of mask 31, and $b$ denoting similar widths for mask 122. For reasons above, the total portion in this rectangle which became paramagnetic is directly proportionate to the information energy received by that rectangle, so that the portion not attracting toner particles any more is likewise proportionate thereto, and only the remaining area will attract toner particles, so that for the total rectangle the amount of toner adhering is proportionate to the gray tone of the original in the area under consideration. This requires, of course, also a triangular pattern of the biasing energy in station 130 and as depicted in FIGS. 4 or 11g. It does not, however, require linear slopes for the biasing produced by the mask 122 in station 120, as the bias in station 120 produces unmodulated strips of similar width and of paramagnetic and ferromagnetic states, so that the particular configuration of the thermal bias curve shown in FIG. 10b, above and below level 222 are quite immaterial except that for a width $b$ the temperature should be above curie point, and for the two neighboring zones, each also having width $b$, the temperature is to remain below the curie point. In case $b \ll a$, the paramagnetic and ferromagnetic strips (i.e., zones 172 and 171 in FIG. 11b) do not even have to be similarly wide as long as any width-variation modulation remains below $2a$ so that any square of $(2a)^2$ or resolution size of the layer 111 leaving station 20 can be regarded as attracting the same amount of toner particles with deviations below discernible resolution.

To complete the description of the entire printer station in the return page 183 of the belt may be provided a cleaning device 186 to remove any toner residual. Magnetic erasure is not necessary as the strong magnet 115 providing the initial bias inherently causes the erasure of any previous magnetization, as was stated above, thereby a uniform magnetization as was shown and described above with reference to FIG. 11a is established permitting cyclic operation of the printing platen-belt 110.

The system as disclosed permits modifications, some of which shall be discussed in the following. It is not essential, that the initial magnetization be established in the manner described. One can substitute magnet 115 and station 120 by a transducer extending across the entire width of the belt, and receiving an A.C. signal to inscribe a line pattern, with the lines extending across and still having the configuration as shown in FIG. 11c. In this case the mask 31 must have its lines oriented parallel to the direction of belt propagation and not transverse as illustrated. Still alternatively one can use magnet 115, and one can modify station 120 in that its mask is defined by just a thin slot extending across belt 110. The lamp 121 is then periodically triggered for flashing to produce the line pattern (FIG. 11b—90° rotation) of the initial bias. In this case coils 127 can be substituted by a rather weak permanent magnet inside of the loop of belt 110, but registering with the thin slot, to produce the magnetization in lines 172 (FIG. 11c—also turned by 90°).

We have repeatedly stated above that the various line patterns should be above the resolution of the eye. This of course holds true only if in fact maximum results are desired. The inventive system is in fact capable of providing variable gray tone printing in which the auxiliary line structure used to establish these gray zones are not per se visible. Wherever a less sophisticated printing is tolerable, it is of course possible to operate the system on a coarser scale and with coarser grating patterns.

The object 151 the image of which is to be copy-printed, is shown to be illuminated in station 130 to produce a contrast by reflection in accordance with its gray tone. Instead, one can use a film or transparencies having a two-dimensionally modulated translucency as is common for developed photographic film. Also the biasing and imaging portions of station 130 can be positioned on one and the same side of the belt. In this case optical means are to be provided for superpositioning the two different beams to form a common image field in the same image plane. For this modification the belt does not have to be provided with a transparent backing member.

The belt may be substituted by a drum or the thermomagnetic storage carrier does not have to be a belt or a drum but may comprise a long tape, or one could use individual plates. If one uses a printer tape, the station shown in FIG. 1 can be used except that between magnet 39 and station 30, a station analogous to station 120 in FIG. 9 has to be interposed. This aspect is of interest for those cases in which the actual printing is to be performed some place else or later in time or both. The printing platen used here permits long storage such as is the case with the magnetic surface recording.

FIG. 13 illustrates a modification of the system shown in FIG. 9. The belt 110 is provided as heretofore described. Biasing stations 115 and 120 and printing station 190 are also the same, and they are, therefore, not illustrated again. Illustrated is only an imaging station 90. It is thus presumed that the belt 110 enters station 90 with a magnetic bias just as shown in FIG. 11c. The line pattern runs in the direction of belt propagation.

A light spot 91 describes the heating track on the layer 111 of belt 110. The spot 91 runs periodically across the belt which movement is controlled by a scanner 93. The intensity of the spot is controlled from a signal source 94 providing, for example, an electrical signal which represents a line-for-line scanning signal of the picture to be reproduced. For example, a sharply focused light beam may originate in a light source 92 to produce the light spot 91. The light source 92 is, as far as intensity is concerned, controlled directly from the signal source 94, or there is a constant illumination output source with optical "light valve" controlled by source 94.

The deflecting device 93 may, for example, be a mirror wheel which deflects the spot 91, i.e., the mirror wheel 93 is interposed in the light path extending from the light source 92 proper to the area where the spot 91 may intercept belt 110. Alternatively the light spot may originate on a fluorescent screen of a cathode-ray tube extending across the belt 110. The electric beam of the tube is to be controlled from the signal source 94, and is deflected electrically as is conventional for a cathode-ray tube. The light proper is then produced on the fluorescent screen juxtaposed to the belt 110.

The modulation of the electrical signal may be generated artificially, so that the final print out is the first pictorial information of the information as presented. Alternatively, the electrical signal may originate from a line-for-line scanner, for example, of a remotely positioned facsimile transmission facility. Another possibility is that the signal originates from a magnetic video recording or in a television camera directly. As far as the invention is concerned, all these possibilities are regarded as being equivalent.

Underneath the belt 110 there is a weak magnet 95 tending to magnetize the carrier 110 longitudinally, but succeeding only in those portions which have become paramagnetic by heating from the light spot 91. The spot 91 as it travels across the belt heats the belt along the track of the travel path. The intensity of heating of any area intercepted by the beam forming on the spot 91 depends on the intensity of the beam at the instant of interception, which in turn is determined by the strength of the signal from source 94. Thus, the width of the paramagnetic track as inscribed on the belt 110 is proportionate to the intensity of the signal from source 94. It is, of course, apparent that the tracks must run perpendicular to the line pattern of the original biasing magnetization, and it can be seen that in comparison with the station 130, that it is now a single beam which provides both the information modulation and the line pattern.

The FIG. 11f can now be interpreted as showing neighboring tracks 190 produced during sequential scanning cycles or runs of light spot 91. A bias such as grid 31 is not needed here; instead certain rules for the scanning beam have to be observed: The distance from center to center of neighboring tracks (190') must very accurately be equal to the track width for a complete white image increment. If the tracks are farther apart, it will be impossible to print a truly white picture portion. If the tracks are closer, then gray tones in the upper end of the gray tone scale will become white also with a corresponding loss of fine contrasts in the brighter image portions.

It may be advisable to either preheat the tape, or the light source 92 may be controlled so that an information signal level zero for a dark image portion produces a particular minimum intensity from light source 92 raising the temperature in the center of the focused light beam, i.e., in the center of spot 91 close to the curie point. For this it is a great convenience, that in a sharply focused "dot," the center receives maximum energy and there is a gradual decrease towards the sides rather than a sharp drop-off, so that for continued information signal zero the inscribed tracks will resemble lines 175 in FIG. 11d.

It should be noted here, that the light spot 91 may have an energy distribution which has a maximum in the center, and a Gaussian distribution around the center. In this case the source 94 has to process the electrical signal controlling the intensity of light source 92, so that the width variations of the track are directly proportionate to the gray tone value attempted to be produced along the track. Alternatively, the spatial intensity distribution of the light source can be controlled to drop linear from a center peak, at least over a region of intensity values equivalent to the range over which the information varies as between "dark" and "light" over the gray tone scale.

What is claimed is:

1. Apparatus for providing magnetic recordings on a storage carrier having a layer of low curie point ferromagnetic material, and having at least one surface exposable to radiant energy, comprising:

means for providing a particular magnetization to said layer;

means for providing for a short period of time a first beam of radiant energy onto said storage carrier, the beam being intensity modulated in accordance with the information to be recorded and in two dimensions effective co-planar with said surface;

means for providing a second beam of radiant energy to said storage carrier to concur with the first beam, the second beam being intensity modulated in accordance with a regular two-dimensional modulation pattern effective co-planar with said surface, whereby each layer increment underneath said surface receives a particular amount of radiant energy from said first and said second beams; and means for magnetizing those portions of said layer receiving radiant energy in excess of a predetermined minimum as provided by said two beams, the magnetization thus provided being different from the particular magnetization as remaining in the portions of said layer receiving radiant energy less than said minimum.

2. In an apparatus for providing magnetic recordings on a storage carrier having a low curie point and at least one surface exposable to radiant energy, the carrier being magnetized in accordance with particular characteristics, comprising:

means for providing for a short period of time a first beam of radiant energy onto such storage carrier, the beam being intensity modulated in accordance with the information to be recorded and in two dimensions effective co-planar with said surface;

means for providing a second beam of radiant energy to said storage carrier to concur with the first beam, the second beam being intensity modulated in accordance with a regular two-dimensional modulation pattern effectively co-planar with said surface, having in at least one dimension recurring maxima flanked by substantially linearly declining radiation intensities in at least said one dimension, layer increments underneath said surface receive particular amounts of radiant energy from said first and from said second beam to become paramagnetic in the vicinity of said maxima, the incremental portions which become paramagnetic having sizes adjacent the maxima along said one dimension proportionate to the respective intensities of the first beam in the vicinity of the maximas; and means for magnetizing the paramagnetic portions of the carrier while reverting to the ferromagnetic state after decay of said first and second beams, the magnetization having characteristics different from the particular characteristics.

3. A method for providing a magnetic recording, comprising the steps of:

providing a low curie point storage carrier with a uniform longitudinal magnetization;

applying a burst of radiant energy to the carrier to provide for a regularly modulated heating pattern to the carrier;

applying concurrently to the last step an information-bearing burst of radiant energy to the carrier;

applying concurrently with the two previous steps a weak reversing magnetic field which persists beyond the duration of said burst; and permitting cooling of the carrier while said reversing field persists.

4. A method for copying photographic images upon a magnetic storage carrier, comprising steps of:
providing a flat low curie point storage carrier with a longitudinal uniform remanent magnetization;
positioning a photographic transparency in optical relation to the storage carrier;
directing a beam of radiant energy onto the carrier as brief burst and having a regular intensity modulation spatially varying in at least one dimension colinear with the extension of the carrier to provide a regular two-dimensional heating pattern to said carrier with gradual regular changes from high to low to high heated portions in at least said one dimension, the beam bypassing the transparency;
directing, concurrently with the previous directing step, a beam of light through the transparency to be intensity modulated by the photographic picture on the transparency, the intensity modulated beam of the second directing step being superimposed upon the heating pattern of said carrier as resulting from the first directing step; and
applying a weak reversing magnetic field to the carrier when subjected to the two beams and sustaining the field during a period of cooling to succeed the two directing steps.

5. Apparatus for providing a recording on a magnetic storage carrier having a low curie point separating ferromagnetic and paramagnetic states in dependence upon temperature, comprising:
masking means defining a regular grating pattern;
radiation providing means for providing bursts of radiant energy, a first burst being directed onto the carrier through the masking means to provide in the carrier and over an area thereon, a pattern of variable temperature distribution with regularly substantially increasing and decreasing temperatures in at least one dimension, the second burst of energy concurring with the first burst and being directed onto the carrier and being intensity modulated in accordance with a two-dimensional information pattern prior to reaching the carrier, the two bursts together providing for localized temporary paramagnetic states in the carrier; and
means for providing a magnetic field to said carrier and maintaining the field after termination of said two bursts of energy when the area of paramagnetic states of the carrier return to a ferromagnetic state, so that a particular remanent magnetization is imparted upon the areas which become paramagnetic upon occurrence of the two bursts of energy, without affecting the magnetic statet of the portion of the carrier which did not become paramagnetic.

6. A copy apparatus as set forth in claim 5, wherein the magnetic storage carrier comprises a low curie point material forming a thin layer on a transparent backing member, and wherein a photographic recording with a developed photographic emulsion having opaque, translucent and semi-opaque regions is provided to produce said two-dimensional information pattern, comprising:
first and second radiation means included in the said radiation means, for respectively providing radiation for the first and second bursts of radiant energy, the masking means being a grating plate for juxtapositioning with the transparent backing member, the first radiation means emitting radiation to form said first modulated burst after the emitted radiation has in parts traversed said grating plate, to traverse the backing member before reaching the thin layer, the photographic emulsion being juxtaposed to the thin layer, the second radiation means directing an unmodulated beam of radiant energy through the emulsion for providing the second modulated burst.

7. A copy apparatus as set forth in claim 5, wherein the magnetic storage carrier comprises a low curie point material forming a thin layer on a transparent backing member, there being optical means for imaging the masking means onto the carrier, the first burst providing the radiation for imaging the masking means.

8. A copy apparatus as set forth in claim 5, wherein the magnetic storage carrier comprises a low curie point material forming a thin layer on a transparent backing member, and wherein the radiation providing means includes optical means for imaging a contrast-producing surface onto the carrier, the second burst providing the image producing radiation.

9. Apparatus for providing magnetic recordings on a storage carrier having a surface underneath of which is material having a low curie point which separates the ferromagnetic state from the paramagnetic state of the material, comprising:
means for providing for a short period of time a first beam of radiant energy onto such storage carrier, the beam being intensity modulated in accordance with the information to be recorded and in two dimensions effective co-planar with said surface;
means for providing a second beam of radiant energy to said storage carrier to concur with the first beam, the second beam being intensity modulated in accordance with a regular two-dimensional pattern effective co-planar with said surface, the pattern including energy peaks arranged on a recurring basis in at least one direction, each peak being flanked by substantially linear slopes representing linearly declining radiation energy intensities, each layer increment underneath said surface receives a particular amount of radiant energy from said first and second beams; and
means for magnetizing said carrier so that the residual magnetization after decay of said first and second beam represents said regular pattern as provided by said second beam with superimposed information modulation as provided by said first beam.

10. Apparatus for providing magnetic recordings on a storage carrier having a surface underneath of which is material having a low curie point which separates the ferromagnetic state from the paramagnetic state of the material, comprising:
means for providing a regular two-dimensional modulation pattern of magnetic states in said carrier, alternating regularly in at least one dimension between first regions in the ferromagnetic state and second regions being at least close to the paramagnetic state;
means for providing a burst of radiant energy to said carrier, the intensity of the radiant energy being modulated in two dimensions in accordance with the information to be recorded and effective to render said second regions paramagnetic over a sized area depending upon the local intensity of radiant energy as resulting from the burst; and
means for magnetizing said carrier so that after decay of said burst the residual magnetization in said first regions differs from the residual magnetization in said second regions.

11. Apparatus for providing magnetic recordings on a storage carrier having a surface underneath which is material having a low curie point which separates the ferromagnetic state from the paramagnetic state of the material, comprising:
means for providing temporarily a regular two-dimensional thermal pattern in a surface layer of said carrier, the pattern being defined by regularly arranged temperature maxima arranged on a recurrent basis in at least one direction, the maxima being flanked by linearly declining temperatures along said direction;
means for applying a burst of radiant energy to said carrier the intensity of the radiant energy being modulated in two dimensions in accordance with the information to be recorded, whereby regions of variable size are established in said carrier and extending respectively next to said maxima, the regions being defined by portions of the carrier temporarily attaining temperatures above a predetermined value as a result of the absorption of radiant energy in the carrier adjacent said maxima; and means for magnetizing said carrier so that subsequent to the decay of the burst the residual state of magnetization in said defined regions of variable size differs from the residual state of magnetization outside of the said variable size regions.

12. In combination for use with a medium having properties of storing energy to represent information and having properties of losing this stored energy and storing new energy in accordance with the characteristics of an image when subjected to temperature above a particular value, first means for providing the medium as successive areas along the medium with energy having a particularly variable pattern along progressive positions in each of the successive areas, second means for subjecting the medium at each of the successive areas on the medium to energy having an intensity dependent upon the characteristics of the image at the successive positions to raise a controlled portion of each such area above the particular temperature in accordance with the characteristics of the image, and third means for providing the medium with a particular energy pattern in the portions of the areas above the particular temperature where the particular energy pattern is different from the particular variable pattern.

13. The combination set forth in claim 12 wherein the second means provides a triangular pattern of energy along the progressive positions in each of the areas and wherein the energy provided by the third means is magnetic.

14. In combination for use with a medium having properties of storing energy to represent information and having properties of losing this stored energy and storing new energy in accordance with the characteristics of an image when subjected to temperatures above a particular value, first means for initially storing energy in the medium in a particular pattern at progressive positions on the medium, second means for providing a linear increase and decrease of the temperature characteristics of the medium at progressive positions on a recurrent basis, third means for varying the temperature characteristics produced by the second means in accordance with the characteristics of the image at the progressive positions to provide the medium with temperatures above the particular value at different positions in a pattern dependent upon the characteristics of the image, and fourth means for storing energy with particular characteristics on the medium at the positions on the medium above the particular temperature.

15. The combination set forth in claim 14 wherein the energy stored by the fourth means is magnetic and wherein fifth means are provided for applying a coating to the medium in accordance with the magnetic characteristics of the medium after the storage of the magnetic energy on the medium by the fourth means.

16. A method for use with a medium having properties of providing information in magnetic form and having properties of losing this magnetic information and receiving new magnetic information in accordance with the characteristics of an image when subjected to temperatures above a particular value, including the steps of:

initially operating upon the medium to provide a particular magnetic pattern on the medium, providing the medium with a particular variable pattern of temperature characteristics along progressive positions in each of a plurality of successive areas on the medium, varying the temperature characteristics of each of the successive areas in accordance with the characteristics of the image in an individual area on the image to produce on the medium different portions of each area above the particular temperature in accordance with the characteristics of the image, and magnetizing the medium with a particular polarity in the portion of each area above the particular temperature.

17. The method set forth in claim 16 wherein the particular magnetic pattern is initially imposed upon the medium in a particular direction and wherein the portions of each area above the particular temperature are subsequently magnetized in a direction opposite to the particular direction.

18. The method set forth in claim 16 wherein the medium is initially magnetized along a first axis and wherein the portion of each area above the particular temperature is subsequently magnetized along an axis transverse to the particular axis.

19. In combination for use with a medium having properties of storing energy to represent information and having properties of losing this storage energy and storing new energy in accordance with the characteristics of an image when subjected to temperatures above a particular value, first means for providing a first pattern of remanent energy on the medium along a particular axis, second means for producing a recurrent pattern of energy characteristics, third means for varying the temperature characteristics of the medium at progressive positions along the medium in accordance with the characteristics of the image at the progressive positions and in accordance with the recurrent pattern of energy characteristic to provide variable portions of the medium with temperatures above the particular temperature in accordance with the composite of the recurrent pattern of energy characteristics and the image characteristics at the progressive positions, and fourth means for providing for a second pattern of remanent energy on the medium in a second direction transverse to the particular axis at the portions of the medium above the particular temperature.

20. The combination set forth in claim 19 wherein the remanent energy provided by the first and second means is magnetic.

21. The combination set forth in claim 19 wherein the remanent energy provided by the first and fourth means is electrostatic.

22. The combination set forth in claim 19 wherein the second means simultaneously produces the recurrent pattern of energy characteristics at a plurality of the different positions on the medium and wherein the third means simultaneously varies the temperature characteristics at the plurality of the different positions on the medium in accordance with the characteristics of the image at the corresponding positions.

23. The combination set forth in claim 19 wherein the second means sequentially produces the recurrent pattern of energy characteristics and wherein the third means sequentially varies the temperature characteristics at the plurality of the different positions on the medium in accordance with the characteristics of the image at the corresponding positions and in accordance with the energy characteristics produced by the second means at each successive instant.

24. A device for preparing a printing platen, the platen being a low curie point, magnetizable storage carrier having an exposed surface, the device comprising:

first means for providing a magnetization pattern onto the carrier at said exposed surface, so that any incremental surface area having dimensions of the desired resolution and above, has at least one zone in which the normal component of the magnetic field gradient has maximum values in comparison with the normal gradient in the environment of the zone within said any surface area;

second means for providing to said surface contrast-bearing information for providing to the subsurface area material thermal energy, along a fine resolution pattern, to render a portion of any area having a size of at least desired resolution dimensions, temporarily paramagnetic, the size of the portion being proportionate to the intensity of the information as provided to the resolution size area; and means for applying a toner to said exposed surface, the toner having magnetizable particles of a size below the resolution of any of said patterns.

25. A device as set forth in claim 24, said first means providing a line pattern of alternatingly directed longitudinal magnetizations to said surface, the magnetization in each line being directed transversely to the extension of the line, the magnetization in neighboring lines being oriented in opposite directions for establishing a line pattern of maximum normal magnetic field gradients along border zones of neighboring lines.

26. The devices as set forth in claim 24, including in addition, means for magnetizing the carrier at below room temperature coercivity to magnetize the temporarily paramagnetic areas when reverting to the ferromagnetic state.

27. The device as set forth in claim 24, said second means comprising a line-for-line scanner including a beam of radiant energy inscribing a heating track across said surface to erase the magnetization along a track the width of which being proportionate to the temporary intensity of the track inscribing beam.

28. The device as set forth in claim 24, said second means including means for flash imaging a two-dimension representation of the information to be printed onto the said surface, the second means further including a mask with a line pattern and a radiation flashing device concurrently operated with the flash imaging means for providing to the carrier a biasing radiation pattern in accordance with the line pattern of the mask.

29. The device as set forth in claim 28 wherein the carrier is a thin magnetizable layer exposable to radiation through opposite surfaces, one of them being said exposed surface, the flash imaging means and the flash biasing means directing their respectively provided radiation towards opposite surfaces of the carrier.

30. A copy printer comprising:
a low curie point, magnetizable storage carrier having at least one exposed surface;
means for providing alternating magnetic north and south poles respectively extending along lines of a first line pattern across the surface of said carrier;
means for providing to said storage carrier radiant energy, the radiant energy being of variable intensity along the lines of a second line pattern extending transversely to said first line pattern, to selectively erase portions of the north and south poles of the first line pattern and along the second line pattern as provided by the radiant energy; and
means for applying magnetizable toner particles to the carrier for attraction by and adherence to the non-erased north and south poles in said surface.

31. A copy printer as set forth in claim 30, said radiant energy providing means including first means for providing a first radiant field to the storage carrier having in at least one dimension transversely to the direction of propagation of the first radiant field, regularly recurring maxima flanked by substantially linearly declining intensities in said one dimension, and second means for providing a second radiant field concurrently with the first field, to increase the radiation intensities as received by the carrier in accordance with a two-dimensional information pattern, so that in the vicinity of said maxima magnetic poles are erased for distances from the maxima respectively proportionate to the radiation intensities in the vicinity of the maxima.

32. A copy printer as set forth in claim 30, said radiant energy providing means including means for providing a narrow beam onto the carrier, means for providing relative motion between the beam providing means to inscribe a heating track onto the carrier in parallel sections, and means for controlling the beam intensity so that the track width is a representation of pictorial information along a substantially linear gray scale.

33. A copy printer wherein two-dimensional, contrast-producing information is to be copied on paper or the like, the combination comprising:
a storage carrier having an exposed surface;
means for providing in the carrier, at said surface a first dense line pattern along which an attraction force normal to the surface is set up for attracting toner particles;
means for providing to said carrier radiant energy, the intensity of which representing the information, to erase a portion of the first line pattern along a second line pattern orthogonal to the first line pattern, the degree of erasure being representative of the information to be copy printed; and
means for applying a toner to the surface for adherence to those portions of said surface still exhibiting the attraction force where not subjected to erasure by radiant energy.

34. In a copy printer, wherein two-dimensional, contrast-producing information is to be copy printed on paper or the like, the combination comprising:
a storage carrier having at least one exposed surface and having characteristics of retaining at least temporarily localized polarizations of its molecular structure at the surface to exhibit a field coacting with particles of a polarizable toner material, and wherein a gradiant of such field imparts and attracting force upon such polarized toner particles;
means for providing in said carrier at said exposed surface thereof localized polarization of the molecular structure, the polarizations resulting in normal field gradients periodically alternating in their directions and having in between, neighboring regions of substantially vanishing normal gradient regions, to follow each other at a spatial rate in accordance with a predetermined resolution of copy printing;
means for providing radiant energy to said carrier, the radiant energy having characteristics of selectively locally destroying the polarization in the carrier to thereby destroy the normal gradient of the field which results from the previously established polarization at said exposed surface, the intensity of the radiant energy being areawise modulated in accordance with the information to be copy printed; and
means for applying a toner to the surface of the carrier, the toner including particles having characteristics of being polarized for attraction by and adherence to the surface area where having said normal gradients, so that the toner particles will adhere to the surface carrier where the polarization thereof has not been destroyed by radiant energy.

35. A printing method comprising the steps of:
providing a printing platen with a line pattern of regions exhibiting distinct normally oriented attracting forces for polarizable toner particles;
erasing along a second line pattern, orthogonally oriented to the first line pattern, discrete portions of the first line pattern so that regions in which said erasures occurred substantially do not exhibit said attracting forces; and
applying a toner which includes polarizable toner particles to the platen for adherence to those regions still exhibiting the attracting force.

36. A device for providing a printing platen for use with a toner which includes magnetizable particles, comprising:
- a low curie point, magnetizable storage carrier having an exposed surface;
- means for providing a spatially variable distribution of magnetic dipole orientations in the carrier, the variations being at lesser spatial rate than the normal random distribution of the dipoles, so that any surface area of the surface having dimensions of the desired resolution has at least one region of maximum magnetic field gradient normal to the surface in comparison with the field gradient in the environment of the region within said surface area;
- means for erasing the magnetization in selected areas, the areas having in at least one surface dimensions of variable size at the desired resolution or smaller, said size being proportionate to localized information of a two-dimensional information pattern; and
- means for uniformly remagnetizing said areas.

37. In a printing device for printing pictorial information at a given resolution, the combination comprising:
- a low curie point magnetizable storage carrier having an exposed surface, and being magnetized so that any surface area having dimensions of the resolution or larger has at least one region of maximum magnetic field gradient in comparison with the gradient strength in the environment of the region within said surface area;
- radiation providing means for imaging contrast-bearing information onto said surface for providing to the subsurface carrier material a thermal energy pattern imaging the information; and
- means for thermally biasing the carrier at the surface in accordance with a pattern the variation of which having said resolution, to render a portion of any surface area of resolution size dimension temporarily paramagnetic, the size of the portion being proportionate to the intensity of the radiation provided onto any said area.

38. In a printing device, the combination comprising:
- a low curie point magnetizable storage carrier having at least one exposed surface;
- first means for magnetizing the storage carrier at said surface in accordance with a line pattern, the magnetization having alternating opposite directions in sequential lines, the directions being substantially orthogonal to the extension of the lines in the pattern;
- second means for providing to the carrier a magnetic field in the direction of said lines and having intensity below room temperature coercivity;
- third means for providing a radiant field to said carrier having a periodic, substantially linearly raising and declining intensity modulation in the direction of said lines, thereby a uniform radiation field distribution being provided in a second line pattern orthogonal to said lines;
- fourth means for providing a two-dimensionally modulated information bearing, second field of radiant energy to said carrier, to erase the magnetization as provided by the first means in areas along lines of said second line pattern, the areas of erasure having localized dimensions in accordance with the localized intensity of the information field, the erasure in said areas resulting from temporary paramagnetic states of the carrier in said areas, the second means providing a substitute magnetization in said areas when the carrier reverts to the ferromagnetic state; and
- fifth means for providing a toner to said exposed surface of said carrier, the toner having magnetizable particles.

39. The method for providing magnetic copies of images, comprising the steps of:
- providing modulated radiation to a magnetic storage carrier for temporarily providing therein regions in the paramagnetic state;
- controlling the modulation of the total radiation intensity as provided, in accordance with a two dimensional amplitude modulated pattern of the radiation intensities as alternatingly rising and falling along at least one direction, to obtain discrete regions of the carrier in the paramagnetic state, the two dimensional amplitude modulation representing an image; and
- magnetizing the carrier so that the magnetization in the temporarily paramagnetic regions after reversion to the ferromagnetic state differs from the magnetization in the remaining regions.

References Cited

UNITED STATES PATENTS

| | | | |
|---|---|---|---|
| 2,793,135 | 5/1957 | Sims | 346—74 |
| 2,915,594 | 12/1959 | Burns | 346—74 |
| 3,110,594 | 11/1963 | Howe | 96—45 |
| 3,212,889 | 10/1965 | Gurdlach | 96—45 |
| 3,212,891 | 10/1965 | Longworth | 96—45 |
| 3,250,636 | 5/1966 | Wilferth | 346—74 |

BERNARD KONICK, Primary Examiner

G. M. HOFFMAN, Assistant Examiner

U.S. Cl. X.R.

96—45; 250—65